United States Patent
Nagata et al.

(10) Patent No.: US 9,073,772 B2
(45) Date of Patent: Jul. 7, 2015

(54) CONDUIT STRUCTURE FOR MOLTEN GLASS, VACUUM DEGASSING APPARATUS, VACUUM DEGASSING METHOD FOR MOLTEN GLASS AND PROCESS FOR PRODUCING GLASS PRODUCTS EMPLOYING SAID CONDUIT STRUCTURE

(71) Applicant: ASAHI GLASS COMPANY, LIMITED, Chiyoda-ku (JP)

(72) Inventors: Takahiro Nagata, Chiyoda-ku (JP); Wataru Miyoshi, Chiyoda-ku (JP); Hajime Itoh, Chiyoda-ku (JP); Hiroaki Hamamoto, Chiyoda-ku (JP); Michito Sasaki, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 332 days.

(21) Appl. No.: 13/758,671

(22) Filed: Feb. 4, 2013

(65) Prior Publication Data

US 2013/0186142 A1 Jul. 25, 2013

Related U.S. Application Data

(63) Continuation of application No. PCT/JP2011/067518, filed on Jul. 29, 2011.

(30) Foreign Application Priority Data

Aug. 4, 2010 (JP) .................................. 2010-175504

(51) Int. Cl.
*C03B 5/20* (2006.01)
*C03B 5/225* (2006.01)
(Continued)

(52) U.S. Cl.
CPC ............... *C03B 5/2252* (2013.01); *C03B 5/262* (2013.01); *C03B 5/42* (2013.01); *F16L 7/00* (2013.01); *F16L 9/18* (2013.01)

(58) Field of Classification Search
CPC ............ C03B 5/42; C03B 5/425; C03B 5/16; C03B 5/20; C03B 5/205; C03B 5/2252; C03B 5/225; C03B 5/26; C03B 5/262; F16L 9/18; F16L 7/00
See application file for complete search history.

(56) References Cited

U.S. PATENT DOCUMENTS 7,628,037 B2 * 12/2009 Lautenschlaeger et al. . 65/29.12
8,256,951 B2 *  9/2012 Adelsberg et al. ......... 366/328.1
(Continued)

FOREIGN PATENT DOCUMENTS

JP      2-221129      9/1990
JP     11-139834      5/1999
(Continued)

OTHER PUBLICATIONS

International Search Report issued in PCT/JP2011/067518 dated Aug. 30, 2011, filed Jul. 29, 2011.

*Primary Examiner* — Jason L Lazorcik
(74) *Attorney, Agent, or Firm* — Oblon, McClelland, Maier & Neustadt, L.L.P.

(57) ABSTRACT

A conduit structure for molten glass, in which molten glass is flown through a double-pipe structure, with little stress loading even for a long time operation. A supporting rib connecting an inner pipe and an outer pipe is employed in the double pipe structure having the inner pipe and outer pipe in the conduit structure for molten glass, wherein excessive stress concentration hardly occurs in an inner pipe-joint portion, an outer pipe-joint portion and the rib when the rib is applied with a stress load due to the weight of the inner pipe.

15 Claims, 9 Drawing Sheets

(51) Int. Cl.
  *C03B 5/26* (2006.01)
  *C03B 5/42* (2006.01)
  *F16L 7/00* (2006.01)
  *F16L 9/18* (2006.01)

(56) References Cited

U.S. PATENT DOCUMENTS

| | | | |
|---|---|---|---|
| 8,375,748 B2* | 2/2013 | Nakane | 65/374.11 |
| 2003/0037572 A1* | 2/2003 | Dick et al. | 65/134.9 |
| 2004/0261450 A1 | 12/2004 | Yoshino et al. | |
| 2008/0057275 A1* | 3/2008 | Grzesik et al. | 428/195.1 |
| 2009/0165501 A1* | 7/2009 | Sasaki et al. | 65/134.2 |
| 2010/0319403 A1* | 12/2010 | Nishikawa et al. | 65/346 |
| 2013/0160493 A1* | 6/2013 | Hamamoto et al. | 65/66 |
| 2013/0186142 A1* | 7/2013 | Nagata et al. | 65/83 |
| 2014/0123710 A1* | 5/2014 | Lineman et al. | 65/135.1 |

FOREIGN PATENT DOCUMENTS

| | | |
|---|---|---|
| JP | 2004-270928 | 9/2004 |
| JP | 2006-132653 | 5/2006 |
| WO | 2008/026606 | 3/2008 |
| WO | WO 2009107531 A1 * | 9/2009 |

* cited by examiner

CONDUIT STRUCTURE FOR MOLTEN GLASS, VACUUM DEGASSING APPARATUS, VACUUM DEGASSING METHOD FOR MOLTEN GLASS AND PROCESS FOR PRODUCING GLASS PRODUCTS EMPLOYING SAID CONDUIT STRUCTURE

TECHNICAL FIELD

The present invention relates to a conduit structure for molten glass, a vacuum degassing apparatus, a vacuum degassing method for molten glass and a process for producing glass products employing such a conduit structure.

BACKGROUND ART

A vacuum degassing apparatus has conventionally been employed to remove bubbles generated in molten glass prior to forming of the molten glass in a forming apparatus, the molten glass being produced by melting glass materials in a melting tank, so that the quality of formed glass products can be improved.

The vacuum degassing apparatus comprises a vacuum degassing vessel the interior of which is maintained in a predetermined vacuum level. When the molten glass is passed through the vacuum degassing vessel, bubbles contained in the molten glass grow in a relatively short time. The grown bubbles rise in the molten glass owing to their buoyancy. When they reach the surface of the molten glass, they break themselves whereby the bubbles can be removed effectively from the surface of the molten glass.

In an apparatus for producing molten glass such as vacuum degassing apparatus, the material constituting a conduit for molten glass such as a vacuum degassing vessel, an uprising pipe or a downfalling pipe, that constitutes a flow path for molten glass, is required to be excellent in heat resistance and corrosion resistance against molten glass. As a material satisfying this requirement, platinum or a platinum alloy such as a platinum-rhodium alloy, or refractory bricks such as electrocast bricks, are employed. As a material satisfying such a condition, heretofore, a technique of employing a platinum or a platinum alloy such as a platinum-rhodium alloy (refer to Patent Document 1) and a technique of employing refractory bricks such as fused cast bricks (refer to Patent Document 2) have been known.

In the above technique, when a conduit for molten glass is constituted by employing refractory bricks such as fused cast bricks, components contained in the refractory bricks may be melted and mixed into the molten glass in some cases, and as such a component, zirconia melted from zirconia fused cast bricks, alumina melted from alumina silica fused cast bricks or zirconia bricks, may, for example, be mentioned. However, when such a melted component is uniformly dispersed in the molten glass, it is considered to be unlikely that such a component adversely affect a glass to be produced.

On the other hand, when the conduit for molten glass is made of platinum or a platinum alloy, foreign objects caused by platinum or the platinum alloy may be produced on the interface between the platinum wall face and molten glass in some cases. When such foreign objects remain inside the molten glass, glass produced from the molten glass may have defects. Here, when the conduit is made of a metal other than platinum or a platinum alloy, the same problem occurs. Further, regardless of the material forming the conduit for molten glass, bubbles may be produced on the interface between the conduit wall face and the molten glass in some cases, and a structure for removing the above foreign objects or bubbles is considered to be required in the conduit structure for molten glass.

In the conduit structure for molten glass, as a conventional structure for removing foreign objects or bubbles mixed in the molten glass, a drain out structure, an overflow structure, etc. have been employed, but there has been a problem that sufficient removal effect cannot be easily obtained. Under the circumstances, the present inventors have already proposed as an example of conduit structure for discharging molten glass from a vacuum degassing vessel for molten glass, a structure which employs a double pipe structure comprising an inner pipe and an outer pipe provided in the vicinity of the terminal of a conduit, and which can discharge a part of molten glass passing between the inner pipe and the outer pipe to the outside of the main flow of molten glass (refer to Patent Document 3).

PRIOR ART DOCUMENTS

Patent Documents

Patent Document 1: JP-A-2-221129
Patent Document 2: JP-A-11-139834
Patent Document 3: WO2008/026606

DISCLOSURE OF INVENTION

Technical Problem

With the above conduit of double-pipe structure, a boundary laminar flow of molten glass that probably contains foreign objects and bubbles that tend to be produced at a contact portion between the outer pipe and molten glass, is introduced into a flow path between the outer pipe and the inner pipe, and a closed end is provided on the downstream side of the flow path and a discharge path is formed at the closed end, whereby an effect of effectively split and discharge only the boundary laminar flow of molten glass containing bubbles and foreign objects, is obtained. Here, this effect is not limited to the case of employing a double-pipe structure in a vacuum degassing apparatus.

When such a double pipe structure is employed, for example, when the structure is such that the outer pipe is supported at the outlet side of the vacuum degassing vessel for molten glass, it is necessary that the inner pipe present inside the outer pipe is supported by some structure. Accordingly, it is considered to employ a structure of supporting the inner pipe present inside the outer pipe via ribs so as to hang the inner pipe. Further, on the contrary, when the inner pipe is supported by some supporting structure, it is considered to employ a structure of supporting the outer pipe via ribs attached to the outside of the inner pipe.

Thus when a double pipe structure is employed in the conduit structure for molten glass, a structure of supporting the inner pipe or the outer pipe via ribs can be applied. However, when the present inventors studied the double pipe structure, it becomes clear that if the size of the double pipe structure is increased, various problems of the supporting structure of the ribs made of platinum or a platinum alloy, etc. may occur.

For example, a rib is fixed by a joining method such as welding between the inner pipe and the outer pipe in order to support the weight of the inner pipe, so as to bridge the inner pipe and outer pipe. However, when a plurality of ribs having a rectangular shape are provided to bridge the inner pipe and outer pipe, if the weight of inner pipe is increased by increase of the size of the double pipe structure, the joined portions and the ribs contact with a high-temperature molten glass while a large local stress is applied to these portions. Accordingly, it is necessary to employ a rib shape so that no local large stress is applied to each joined portion between the rib and the outer pipe or between the inner pipe and the rib. However, a double pipe structure constituting a conduit for molten glass, wherein the state of stress applied to a rib is precisely analyzed to devise the shape of the rib, has not been proposed heretofore.

For example, if a joined portion between the rib and the inner pipe or a joined portion between the rib and the outer pipe continuously bear a flow of a high-temperature molten glass for a long time while excessive stress is applied to these joined portions, there is a risk that a crack is formed in the joined portion or the rib to destroy the joined portion or the rib. If such a structure is employed for a vacuum degassing apparatus, foreign objects may be mixed in molten glass to cause a problem that inhomogeneous glass flows out. Since these problems become significant as the size of the vacuum degassing apparatus becomes large, if the size of the vacuum degassing apparatus is increased to 5 times to 10 times or more of the present size, the conduit structure portion may limit the increase of the size of the apparatus.

Further, when a partial fracture of a rib is present and a large stress is applied to a joined portion between the rib and the outer pipe to cause a damage to the outer pipe, a serious problem may occur not only in terms of the vacuum degassing apparatus but also in terms of production of glass. Accordingly, it is necessary to employ a structure whereby no excessive stress is applied to the joined portion between the rib and the outer pipe even if a certain stress is applied to the rib.

Further, when a double pipe structure is employed in the conduit structure for molten glass, the wall thickness of a pipe supporting the other pipe is made to be larger than the wall thickness of the other pipe being supported. However, since as compared with a pipe having a large wall thickness, a pipe having a small wall thickness tends to be deformed by the effect of stress due to gravity, it is preferred to define the shape of the rib considering the difference between the inner pipe and the outer pipe in the thickness.

Here, a glass-producing apparatus such as a vacuum degassing apparatus, is an apparatus which is continuously operated for a long time once production of glass starts. Accordingly, when the size of such an apparatus is increased, in the mixture of the above foreign objects may cause deterioration of production efficiency of high quality glass. Further, damage of the outer pipe may cause a serious problem of glass production, such as termination of glass production itself.

From the foregoing background, the present inventors have conceived of a structure of a supporting rib connecting an inner pipe and an outer pipe, which is employed in a double pipe structure having the inner pipe and outer pipe in a conduit structure for molten glass, wherein excessive stress concentration hardly occurs in any of an inner pipe-joined portion, an outer pipe-joined portion and the rib even when the rib is applied with a stress load due to the weight of the inner pipe. It is an object of the present invention to provide a conduit structure for molten glass, which hardly has a problem even with a long time operation. Further, it is an object of the present invention to provide a conduit structure wherein no excessive stress concentration occurs in a joined portion between the supporting rib and the outer pipe even if some certain stress is applied to the supporting rib.

It is an object of the present invention to provide a vacuum degassing apparatus which employs a conduit structure for molten glass which hardly has a problem of e.g. stress concentration, and which does not have a problem even in a long term operation.

It is an object of the present invention to provide a vacuum degassing method for molten glass and a process for producing glass products, which employ the above vacuum degassing apparatus.

Means for Solving the Problems

The present invention provides a conduit structure for molten glass comprising a hollow tube made of a metal, the conduit structure having at least a downstream end having a double pipe structure comprising an inner pipe and an outer pipe, wherein a supporting rib is provided between the inner pipe and the outer pipe to bridge the inner pipe and the outer pipe;

wherein the supporting rib has an inner straight portion joined with the outer face of the inner pipe so as to extend along the longitudinal direction of the inner pipe and having a width substantially in a normal direction to the joined face, an outer straight portion joined with the inner face of the outer pipe so as to extend along the longitudinal direction of the outer pipe and having a width substantially in the normal direction to the joined face, and a connecting wall portion extending from the inner straight portion to the outer straight portion to integrate them; and the supporting rib has a concave portion formed along one side edge of the connecting wall portion present between one side end portion of the inner straight portion and one side end portion of the outer straight portion, so that respective ends of said one side edge reach said one side end portions of the respective straight portions via rounded portions, and a concave portion formed along the other side edge of the connecting wall portion present between the other side end portion of the inner straight portion and the other side end portion of the outer straight portion, so that respective ends of said the other side edge reach said the other side end portions of the respective straight portions via rounded portions, and the supporting rib has projecting portions formed on respective ends of the inner straight portion and respective ends of the outer straight portion and continuing to the respective rounded portions.

The metal in the present invention may be a metal usable for a conduit structure for molten glass and usable under high temperature, and it is preferably platinum, a platinum alloy, molybdenum or indium.

In the conduit structure of the present invention, it is preferred that the depth of the concave portion is within a range of at least 10% and at most 42% based on the total length of the inner straight portion or the length of the outer straight portion of the supporting rib, whichever longer.

In the conduit structure for molten glass of the present invention, it is preferred that the projecting portion has a rectangular projection forming the leading edge side of the projecting portion and having a uniform width in substantially the normal direction to the joined face.

In the conduit structure for molten glass of the present invention, it is preferred that the leading edge shape of the rectangular projection is a shape which forms a step portion on the outer face of the inner pipe or the inner face of the outer pipe when the rectangular protrusion is joined with the outer face or the inner face.

In the conduit structure for molten glass of the present invention, it is preferred that a region between the outer pipe and the inner pipe is a region which gives passage for mainly a boundary laminar flow, that probably contains foreign objects or bubbles, in a molten glass flowing inside the outer pipe, and a means for separating the boundary laminar flow from a main flow, that is the central portion of the molten glass flow, is provided on the terminal side of the region between the outer pipe and the inner pipe.

In the conduit structure for molten glass of the present invention, it is preferred that the wall thickness of the outer pipe is different from the wall thickness of the inner pipe, and the outer straight portion or the inner straight portion, whichever is connected to a pipe having a larger wall thickness, is longer than the other straight portion.

In the conduit structure for molten glass of the present invention, it is preferred that the wall thickness of the outer pipe is larger than the wall thickness of the inner pipe.

In the conduit structure for molten glass of the present invention, it is preferred that a plurality of the supporting ribs are provided at predetermined intervals in the circumferential direction of the inner pipe.

The conduit structure for molten glass of the present invention has a feature that the extension direction of a connecting wall portion integrating the inner straight portion and the outer straight portion is slanted toward the upstream side or the downstream side of the flow direction of molten glass from the inner pipe side to the outer pipe side, and the center position of the joined portion between the inner straight portion and the inner pipe in the longitudinal direction is different from the center position between the joined portion of the outer straight portion and the outer pipe in the longitudinal direction, along the flow direction of molten glass.

In the conduit structure for molten glass of the present invention, it is preferred that among rectangular projections formed on both ends of the inner straight portion, the length of a rectangular projection on the upstream side of the inner pipe is longer than the length of a rectangular projection on the downstream side of the inner pipe.

The present invention provides a vacuum degassing apparatus comprising a vacuum degassing vessel, an uprising pipe for supplying molten glass to the vacuum degassing vessel, and a downfalling pipe for discharging vacuum-degassed molten glass from the vacuum degassing vessel, wherein a terminal side portion of the downfalling pipe or an extension pipe continuing from the downfalling pipe has any one of the above conduit structures for molten glass.

The present invention provides a vacuum degassing method for molten glass, which employs a vacuum degassing apparatus having a vacuum degassing vessel, an uprising pipe for supplying molten glass to the vacuum degassing vessel, and a downfalling pipe for discharging vacuum-degassed molten glass from the vacuum degassing vessel, the method comprising separating a part of the molten glass by employing any one of the above conduit structures on the terminal side of the downfalling pipe or in an extension pipe continuing from the downfalling pipe.

The present invention provides an apparatus for producing glass products, which comprises the above vacuum degassing apparatus, a melting means provided on the upstream side of the vacuum degassing apparatus and for melting a glass material to produce molten glass, a forming means provided on the downstream side of the vacuum degassing apparatus and for forming the molten glass, and an annealing means for annealing the formed glass.

The present invention provides a process for producing glass products, which comprises a step of vacuum-degassing molten glass by the above vacuum degassing method for molten glass, a melting step of melting a glass material on the upstream side of the vacuum degassing apparatus to produce molten glass, a forming step of forming the molten glass on the downstream side of the vacuum degassing apparatus, and an annealing step of annealing the formed glass.

Advantageous Effects of Invention

In a conduit structure having a double pipe structure comprising an inner pipe and an outer pipe, a supporting rib connecting the inner pipe and the outer pipe employs a structure having an inner straight portion to be joined with the inner pipe, an outer straight portion to be joined with the outer pipe and a connecting wall portion, and a concave portion extending along each side end of the connecting wall portion and reaching end portions of the inner straight portion and the outer straight portion, is formed. Consequently, it is possible to prevent excessive concentration of stress in any of an inner pipe-joined portion, an outer pipe-joined portion and the supporting rib. Further, since a projecting portion is provided at each of both ends of each of the inner straight portion and the outer straight portion, the projecting portion of the supporting rib can deform so as to follow deformation of the outer pipe or the inner pipe, and it is possible to realize a conduit structure wherein excessive stress concentration in the inner pipe-joined portion, the outer pipe-joined portion of the supporting rib as well as the supporting rib itself, hardly occurs.

In the supporting rib, when the concave portion is formed to continue to the inner straight portion or the outer straight portion via a rounded portion continuing from the inside of the concave portion, and a rectangular projection having a uniform thickness is provided on further outside of each straight portion, each projecting portion of the supporting rib can flexibly deform so as to follow deformation of the outer pipe or the lower pipe, and it is possible to realize a conduit structure wherein excessive concentration of stress on the inner pipe-joined portion and the outer pipe-joined portion hardly occurs.

In the supporting rib, when the leading edge portion of the rectangular projection has a shape that forms a step portion with respect to the outer face of the inner pipe or the inner face of the outer pipe, it is possible to eliminate a sharp portion at the leading edge of the rectangular projection. Accordingly, after joining by e.g. welding, when a stress is applied to the supporting rib by weight of the inner pipe and the supporting rib is forced to deform in the rotational direction, no stress is applied in such a way that the leading edge of the rectangular projection breaks the inner pipe or the outer pipe. Accordingly, even with a structure of a supporting rib provided with the rectangular projection, there is no risk of breaking the inner pipe or the outer pipe.

When the depth of the concave portion formed in the supporting rib is within a range of from 10 to 42% based on the total length of the inner straight portion and the outer straight portion, whichever longer, each rectangular projection in each projecting portion formed on each side of the inner straight portion or the outer straight portion is easily deformed to follow deformation of the inner pipe or the outer pipe, whereby it is possible to realize a conduit structure wherein excessive concentration of stress on the inner pipe or the outer pipe hardly occurs.

When the outer pipe is thicker than the inner pipe and the outer straight portion is longer than the inner straight portion, since the rotational displacement of the supporting rib is dominated by the outer pipe having higher rigidity, when the projecting portion having high deformation-following property is formed on each end of the outer straight portion of the supporting rib, it is possible to suppress excessive concentration of stress on the joined portion between the outer pipe and the supporting rib. This structure contributes to significant reduction of stress formed in a joined portion between the supporting rib and the outer pipe.

When a vacuum degassing apparatus or a vacuum degassing method employs the above conduit structure, it is possible to obtain an effect of eliminating excessive concentration of stress in a portion of the conduit structure in the vicinity of the supporting rib, and achieving a long term safe operation.

Further, when an apparatus and a method for producing glass products employing the above vacuum degassing apparatus, are employed, it is possible to produce high quality glass for a long time while maintaining a stable quality.

BRIEF EXPLANATION OF DRAWINGS

FIGS. 3(A) and 3(B) show a first embodiment of the supporting rib applied to the conduit structure shown in FIG. 2, wherein FIG. 3(A) is a perspective view and FIG. 3(B) is a partial cross sectional view showing connecting state.

FIGS. 5(A) to 5(F) show embodiments of supporting rib to be applied to the conduit structure shown in FIG. 2, wherein FIG. 5(A) is a side view showing a second embodiment, FIG. 5(B) is a side view showing third embodiment, FIG. 5(C) is a side view showing a fourth embodiment, FIG. 5(D) is a partial explanation view of the fourth embodiment, FIG. 5(E) is a side view showing a fifth embodiment and FIG. 5(F) is a side view showing a sixth embodiment.

FIGS. 6(A) to 6(D) show embodiments of supporting rib in cases of conduit structure wherein the inner pipe is longer than the outer pipe, wherein FIG. 6(A) is a side view showing a seventh embodiment, FIG. 6(B) is a side view showing an eighth embodiment, FIG. 6(C) is a side view showing a ninth embodiment and FIG. 6(D) is a side view showing a tenth embodiment.

DESCRIPTION OF EMBODIMENTS

Now, an embodiment of a conduit structure for molten glass according to the present invention and a vacuum degassing apparatus provided with such a conduit structure, will be described, but the present invention is not limited to the following embodiments. Further, the conduit structure of the present invention is not limited to a form wherein the axis of the pipe is in vertical direction.

Figure 1:
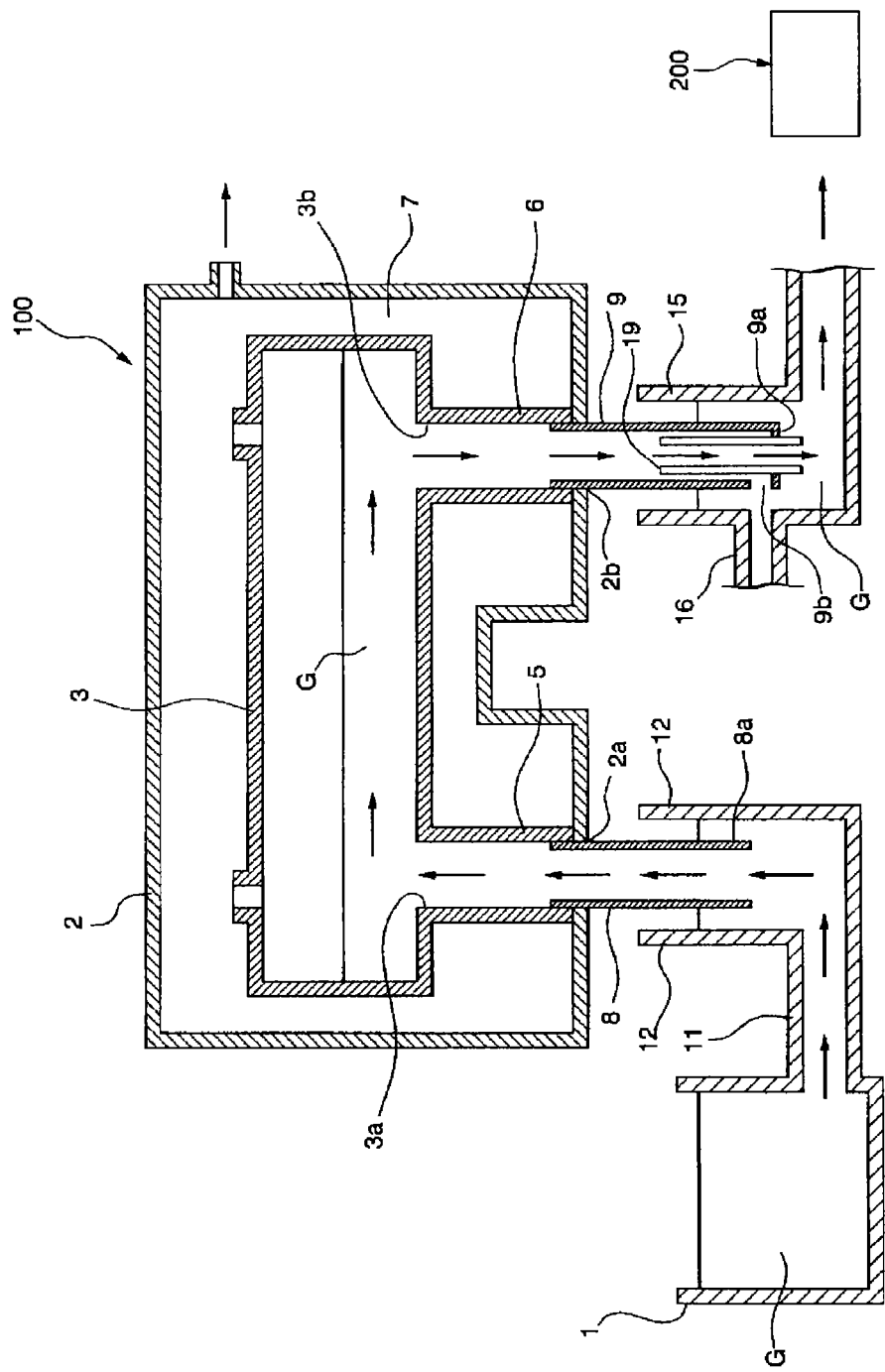
FIG. 1 is a construction view showing a schematic cross sectional structure of an example of vacuum degassing apparatus applied with the conduit structure according to the present invention, and a forming apparatus connected with the vacuum degassing apparatus.

FIG. 1 is a cross sectional view schematically showing an example of the structure of a vacuum degassing apparatus provided with a conduit structure for molten glass according to the present invention. A vacuum degassing apparatus 100 shown in FIG. 1 is an apparatus to be employed for a process comprising vacuum-degassing molten glass G supplied from a melting tank 1 and continuously supplying the molten glass to a forming apparatus 200 for a subsequent step.

The vacuum degassing apparatus 100 of this embodiment has a vacuum housing 2 made of a metal such as a stainless steel, inside of which can be maintained in a reduced pressure state at a time of operation. In the vacuum housing 2, a vacuum degassing vessel 3 is accommodated and disposed so that its longitudinal axis is in horizontal direction. To a lower face of one end of the vacuum degassing vessel 3, an uprising pipe 5 extending in the vertical direction is connected via an introduction port 3a, and to a lower face on the other side of the vessel, a downfalling pipe 6 extending in the vertical direction is connected via an exit port 3b. The uprising pipe 5 and the downfalling pipe 6 are disposed so that they can communicate with the outside via an introduction port 2a and an exit port 2b, respectively, formed on the bottom side of the vacuum housing. Further, in the vacuum housing 2, a heat-insulating member 7 is provided around the vacuum degassing vessel 3, the uprising pipe 5 and the downfalling pipe 6, so that the outside of the vacuum degassing vessel 3, the uprising pipe 5 and the downfalling pipe 6 are surrounded by the heat-insulating member 7.

In the vacuum degassing apparatus 100 having the above structure, the vacuum degassing vessel 3, the uprising pipe 5 and the downfalling pipe 6 are each a hollow tube made of refractory bricks such as fused cast bricks, platinum or a platinum alloy. When the vacuum degassing vessel 3 is a hollow tube made of refractory bricks, it is preferred that the vacuum degassing vessel 3 has a hollow structure made of refractory bricks and having a rectangular external cross sectional shape, and that the internal shape forming a flow path of molten glass has a rectangular cross section. When the vacuum degassing vessel 3 is a hollow tube made of platinum or a platinum alloy, the internal cross sectional shape forming the flow path of molten glass in the vacuum degassing vessel 3 preferably has a circular or an elliptical shape.

When the uprising pipe 5 and the downfalling pipe 6 are each a hollow tube made of refractory bricks, it is preferred that the uprising pipe 5 and the downfalling pipe 6 are each a hollow tube made of refractory bricks and having a circular cross section or a polygonal cross section including rectangle, and that the internal cross section forming a flow path for molten glass is a circular cross section.

When the uprising pipe 5 and the downfalling pipe 6 are each a hollow tube made of platinum or a platinum alloy, the internal cross sectional shape forming a flow path for molten glass in the uprising pipe 5 or the downfalling pipe 6 is preferably a circular shape or an elliptical shape.

A specific example of the dimensions of the uprising pipe 5 and the downfalling pipe 6 is such that the length is from 0.2 to 6 mm, preferably from 0.4 to 5 m, and the width of the internal cross section is from 0.05 to 1 m, preferably from 0.1 to 0.8 m.

Here, when the vacuum degassing apparatus 100 is a large-sized apparatus having a process capacity of at least 200 ton/day or at least 500 ton/day, the vacuum degassing vessel 3 is preferably constituted by refractory bricks such as fused cast bricks.

To the lower end (lower end portion) of the uprising pipe 5, an outer pipe 8 for extension is attached, and to the lower end (lower end portion) of the downfalling pipe 6, an outer pipe 9 for extension is attached. The outer pipes 8 and 9 are made of platinum or a platinum alloy. Here, when the uprising pipe 5 and the downfalling pipe 6 are each a hollow tube made of platinum or a platinum alloy, the structure may be such that the uprising pipe 5 and the downfalling pipe 6 are each integrally extended to include the portion referred to as the outer pipes 8 and 9, respectively, in FIG. 1 without separately providing the outer pipes 8 and 9 for extension. In a case of employing such a structure, explanations for the outer pipes 8 and 9 in this specification can be read as descriptions regarding the uprising pipe and the downfalling pipe made of platinum or a platinum alloy.

The uprising pipe 5 communicates with a bottom portion of one side of the vacuum degassing vessel 3, and introduces a molten glass G from a melting tank 1 into the vacuum degassing vessel 3. For this purpose, the lower end (downstream end) 8a of the outer pipe 8 attached to the uprising pipe 5 is inserted through an open end of an upstream pit 12 connected to the melting tank 1 via a pipe 11, and is immersed in molten glass G in the upstream pit 12. Further, the downfalling pipe 6 communicates with a bottom portion of the other side of the vacuum degassing vessel 3, and discharges a vacuum-degassed molten glass G to a subsequent process vessel (not shown). For this purpose, the lower end (downstream end) of the outer pipe 9 attached to the downfalling pipe 6 is inserted into an open end of a downstream pit 15, and immersed in molten glass G in the downstream pit 15. To one side portion of the downstream pit 15, a drain out 16 is connected. The drain out 16 means a structure comprising a flow-out pipe for discharging a part of molten glass, specifically a boundary laminar flow of molten glass that probably contains e.g. foreign objects, in order to improve homogeneity of molten glass G. Namely, the drain out 16 is provided on a terminal side of a region between the outer pipe and the inner pipe, through which the boundary laminar flow, that probably contains foreign objects or bubbles, mainly flows. This drain out 16 is a means for separating the boundary laminar flow from a main flow in the center portion of molten glass flow.

Further, to the downstream side of the downstream pit 15, a forming apparatus 200 is connected.

In the vacuum degassing apparatus 100 shown in FIG. 1, an outer pipe 9 is provided under a downfalling pipe 6, and on a terminal side of the outer pipe 9, an inner pipe 19 having a slightly smaller diameter than that of the outer pipe 9 is coaxially supported in the outer pipe 9 to form a double pipe structure. The inner pipe 19 is made of a material equivalent to that of the outer pipe 9, and the inner pipe 19 is hung by the outer pipe 9 via supporting ribs 20 to be described later each bridging the inner pipe 19 and the outer pipe 9. The terminal portion 9a of the outer pipe 9 is extended to encompass the outer circumference of the inner pipe 19 to form a closed end, and on the side portion of the closed end, an opening 9b is formed so as to face to the drain out 16 side, so as to allow a part of molten glass G that have passed through a region between the outer pipe 9 and the inner pipe 19 is guided to the drain out 16 side through the opening 9b.

In this embodiment, the outer pipe 9 and the inner pipe 19 are each a hollow cylindrical tube made of platinum or a platinum alloy. As a specific example of the platinum alloy, a platinum-gold alloy, a platinum-rhodium alloy, etc. may be mentioned. The term "platinum or a platinum alloy" in this specification includes a reinforced platinum produced by dispersing a metal oxide in platinum or a platinum alloy. As the metal oxide to be dispersed, an oxide of a metal of Group III, IV or XIII in the long periodic table such as $Al_2O_3$, $ZrO_2$ or $Y_2O_3$, may be mentioned.

As described above, foreign objects or bubbles, etc. contained in molten glass flowing down along the downfalling pipe 6 are not uniformly dispersed in the molten glass but they tend to flow along a boundary laminar flow having a thickness of from 3 to 5 mm along inner faces of the downfalling pipe 6 and the outer pipe 9. Accordingly, when the molten glass flow containing the boundary laminar flow reaches the double pipe structure portion constituted by the outer pipe 9 and the inner pipe 19, the boundary laminar flow flows into a region between the outer pipe 9 and the inner pipe 19 and is discharged to the drain out 16 side from the opening 9b, and a main flow of molten glass (molten glass flow in the center side) except the boundary laminar flow, passes through the inner pipe 19 to move to the downstream side of the downstream pit 15. As a result, only the main flow of molten glass, that is separated from the boundary laminar flow containing foreign objects or bubbles, is supplied to a subsequent forming apparatus 200. On the other hand, molten glass in the boundary laminar flow moved into the drain out 16 side and discharged to the outside of the main flow, is discarded and cut into cullets.

The upper end (upstream end) and the lower end (downstream end) of the inner pipe 19 are open ends, and the lower end of the inner pipe 19 slightly projects downwardly from the terminal portion 9a of the outer pipe 9 in this embodiment. Here, the structure wherein the lower end of the inner pipe 19 projects downwardly from the outer pipe 9 is not essential. So long as the construction is such that the main flow of molten glass G flowing along the center side of the downfalling pipe 6 and the outer pipe 9 can be smoothly introduced into the downstream side of the downstream pit 15, the lower end position of the inner pipe 19 is not restricted. Further, with respect to the structure of the terminal portion 9a of the outer pipe 9 and the opening 9b, it is matter of course that the structure is not limited to the structure shown in FIG. 1 so long as it can separate the boundary laminar flow of molten glass G flowing in the region between the outer pipe 9 and the inner pipe 19 from the main flow of molten glass and it can introduce the boundary laminar flow into the drain out 16 side.

Figure 2:
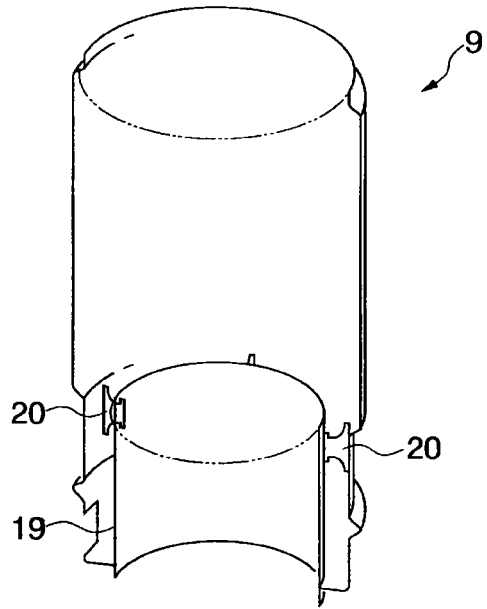
FIG. 2 is a perspective explanation view showing an essential part of the conduit structure applied to the vacuum degassing apparatus shown in FIG. 1.

Further, as shown in FIG. 2, in the outer pipe 9 and the inner pipe 19 of this embodiment, since the structure is such that the outer pipe 9 hangs the inner pipe 19 via a plurality of supporting ribs, the outer pipe 9 is formed to have a larger wall thickness than that of the inner pipe 19.

Figure 3:
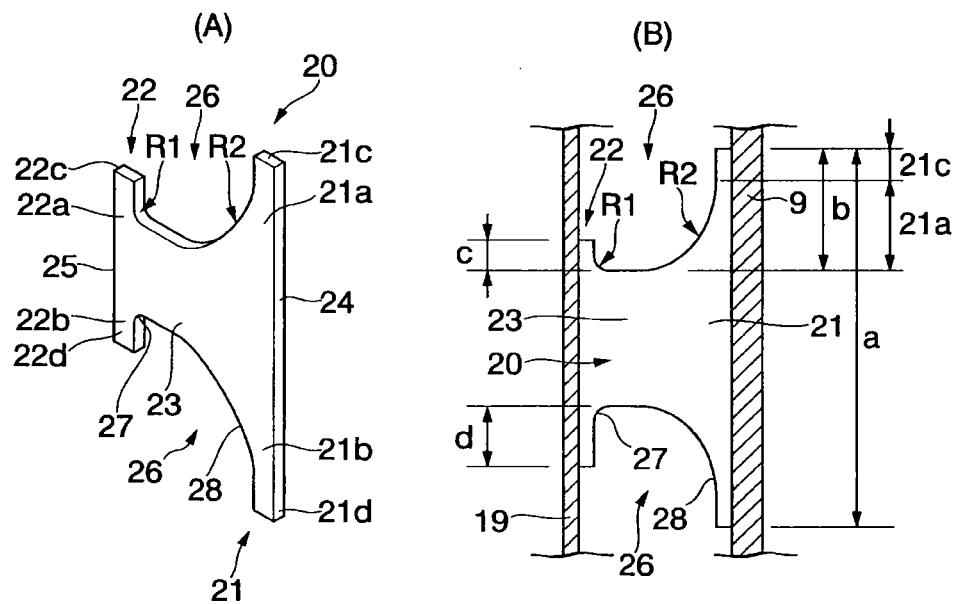

In the vacuum degassing apparatus 100 shown in FIG. 1, the supporting rib 20 according to the present invention is provided in the double pipe structure portion constituted by the outer pipe 9 and the inner pipe 19. A plurality of supporting ribs 20 are disposed in a portion between the outer pipe 9 and the inner pipe 19 in a circumferential direction at constant intervals (four supporting ribs at intervals of 90° in circumferential direction in this embodiment). With respect to the material constituting the supporting ribs 20, the same material as those constituting the outer pipe 9 and the inner pipe 19, for example platinum or a platinum alloy, is employed. As shown in FIG. 3, each supporting rib 20 is constituted by a foot-shaped outer straight portion 21 that is fixed to the inner face of the outer pipe 9 by welding along the longitudinal direction of the outer pipe 20, a foot-shaped inner straight portion 22 that is fixed to the outer face of the inner pipe 19 by welding along the longitudinal direction of the inner pipe 19, and a connecting wall portion 23 integrally connecting the outer straight portion 21 and the inner straight portion 22, and is integrally formed into a plate shape. The thickness t1 of the supporting rib 20 preferably satisfies a relation of $t3<t1<t2$ where the thickness of the outer pipe is t2 and the thickness of the inner pipe 19 is t3 when the structure is such that the outer pipe 9 supports the inner pipe 19 via the supporting ribs 20 since the outer pipe 9 needs to have a thickness larger than that of the inner pipe 19. Further, in a case where the structure is such that the inner pipe 19 supports the outer pipe 9 via the supporting ribs 20, the inner pipe 19 needs to have a thickness larger than that of the outer pipe 9, and a relation $t2<t1<t3$ is preferably satisfied.

In more detail, in the supporting rib 20, on a surface of the outer straight portion 21, a joining face having a vertically elongated rectangular shape having a narrow width, that can contact with the inner face of a straight pipe portion of the outer pipe 9 along the longitudinal direction of the outer pipe 9, is formed, and on a surface of the inner straight portion 22, a joining face 25 having a vertically elongated rectangular shape having a narrow width, that can contact with an outer face of a straight pipe portion of the inner pipe 19, is formed. Further, in the supporting rib 20, a concave portion 26 is formed along each side portion of the connecting wall portion 23 in the width direction, that is, along an edge portion of the connecting wall portion 23 extending from one end of the outer straight portion 21 to one end of the inner straight portion 22, and along an edge portion of the connecting wall portion 23 extending from the other end of the outer straight portion 21 to the other end of the inner straight portion 22.

As shown in FIG. 3, in the supporting rib 20 of this embodiment, the inner face of the concave portion 26 has a concave profile continuously constituted by a profile of a small circle having a curvature radius R1 present on one end (upper end in the Figure) of the inner straight portion 22 and a profile of a large circle having a curvature radius R2 present on one end side of the outer straight portion 21 that are continuously integrated at the lower most portions of these circles. Further, a similar concave portion 26 constituted by profiles of two circles having curvature radiuses of R1 and R2, that are continuously integrated, is formed in the opposite direction also in a edge portion of the connecting wall portion 23 connecting the other end (lower end in the example shown) of the inner straight portion 22 and the other end (lower end in the example shown) of the outer straight portion 21. Accordingly, in the supporting rib 20 of this embodiment, a narrow width portion is formed in the central portion of the connecting wall portion 23, and the side view profile shape of the entire supporting rib 20 is a substantially a trumpet shape. Here, dimensions of portions of the supporting rib 20 shown in FIG. 3 are, for example, such that the total length "a" of the outer straight portion 21 is 117.5 mm, the length "b" from the leading edge (upper end) of a rectangular projection 21c in the outer straight portion 21 to the lower most point of the upper concave portion 26 (that is the depth of the concave portion) is 38.75 mm, the length "c" from the leading edge (upper end) of a rectangular projection 22c in the inner straight portion 22 to the lower most point of the upper concave portion 26 is 11.25 mm, the length "d" from the leading edge (lower end) of a rectangular projection 22d in the inner straight portion 22 to the upper most point of a lower concave portion 26 is 21.25 mm. Here, the concave face constituting the bottom face of the concave portion 26 of the supporting rib 20 is not limited to the smoothly continuing curve of the embodiment shown in FIG. 3, but it may be stepwise, waveform or one constituted by a plurality of slant faces.

The supporting rib 20 having the above structure has a shape wherein the outer straight portion 21 is longer than the inner straight portion 22. The reason why this shape is preferred is that when an inner pipe 19 is supported by an outer pipe 9 by the supporting rib 20, the thickness of the outer pipe 9 is usually formed to be thicker than the thickness of the inner pipe 19, and in this structure, the stress applied to a welded portion between the outer straight portion 21 of the supporting rib 20 and the outer pipe 9 can be significantly reduced. Considering that the inner pipe 19 is hung and supported inside the outer pipe 9 via the supporting rib 20, the rotational displacement of the supporting rib 20 is generally dominated by the outer pipe having a high rigidity. For example, when the thickness of the outer pipe 9 is about twice the thickness of the inner pipe 19, the rigidity ratio between the outer pipe and the inner pipe becomes approximately 12 to 1.

Since the above concave portion 26 is formed on each side of the connecting wall portion 23 of the supporting rib 20 in the height direction (each side in the vertical direction in FIG. 3), projecting portions 21a, 21b each having a constant thickness and a constant width and narrowing toward the leading edge of the outer straight portion 21, are formed on both end portions of the outer straight portion 21 (both end portions in the vertical direction in FIG. 3), and also projecting portions 22a, 22b each having a constant thickness and a constant width and narrowing toward the leading edge of the inner straight portion 22, are formed on both ends of the inner straight portion 22 in the vertical direction. In this embodiment, the lengths of the projecting portions 21a and 21b are equal, but the length of the projecting portions 21a and 21b is longer than the length of the projecting portions 22a and 22b. Further, on the leading edge side of the projecting portion 21a, a rectangular projection 21 having a constant thickness and a substantially constant width is provided; on the leading edge side of the projecting portion 21b, a rectangular projection 21d having a constant thickness and a substantially constant width is provided; on the leading edge side of the projecting portion 22a, a rectangular projection 22c having a constant thickness and a substantially constant width is provided; and on the leading edge side of the projecting portion 22b, a rectangular projection 21d having a constant thickness and a substantially constant width is provided.

With respect to the leading portions of the rectangular projections 21c, 21d, 22c and 22b, as shown in FIG. 3(B), in a state that the outer pipe 9 is joined with the inner pipe 19 via the supporting rib 20 by welding so that the joining face 24 is joined with the inner face of the outer pipe 9 and that the joining face 25 is joined with the outer face of the inner pipe 19 by welding, the leading edge portions of the rectangular projections 21c and 21d form step portions on the inner face of the outer pipe 19 and the rectangular projections 22c and 22d form step portions on the outer face of the inner pipe 19. In other words, the leading edge faces of the rectangular projections 21c, 21d, 22c and 22d each becomes an end face perpendicular or at an angle close to perpendicular to the joining face 24 or the joining face 25. When the leading edge faces of the rectangular projections 21c, 21d, 22c and 22d are each formed to be perpendicular or at an angle close to perpendicular to the joining face 24 or 25, no sharp portion is formed in these leading edge portions, and accordingly, when the joining faces 24 and 25 are welded, deposit of welding is formed to form a welded portion in each of these step portions. Further, according to the simulation analysis to be described later, when the supporting rib 20 is rotated by the weight of the inner pipe 19, since no sharp portions is formed in these leading edge portions, the leading edges of the rectangular projections 21c, 21d, 22c and 22d do not function to penetrate a wall face of the outer pipe 19 or the inner pipe 19.

Further, if the leading edges of the rectangular projections 21c, 21d, 22c and 22d are sharp portions, since insufficient welding tends to occur in such sharp portions, the leading edges of the rectangular projections 21c, 21d, 22c and 22d tend to function to penetrate a wall face of the outer pipe 9 or the inner pipe 19. In order to obtain the above effects, it is necessary to make the leading edge faces of the rectangular projections 21c, 21d, 22c and 22d perpendicular or at an angle close to perpendicular to the joining face, or to form the leading edge faces into slightly projecting curved face, so that the leading edge faces do not damage the wall face of the outer pipe 9 or the inner pipe 19 when the rib 20 is deformed.

In the supporting rib 20 of this embodiment, the outer straight portion 21 means a foot-shaped portion from the leading edge of one rectangular projection 21c to the leading edge of the other rectangular projection 21d and having a joining face 24 to be joined with the outer pipe 9, and the inner straight portion 22 means a foot-shaped portion from the leading edge of one rectangular projection 22c to the leading edge of the other rectangular projection 22d and having a joining face 25 to be joined with the inner pipe 19. Further, with respect to the concave portion 26 formed between the rectangular projection 21c and the rectangular projection 22c, the concave portion 26 has one end in the width direction continuing to the projecting portion 22a on a non-joining side of the inner straight portion 22 via a rounded portion 27 having curvature radius of R1, and the concave portion 26 has the other end in the width direction continuing to the projecting portion 21a on a non-joining side of the outer straight portion 21 via a rounded portion 28 having a curvature radius of R2. Further, with respect to a concave portion 26 formed between the rectangular projection 21d and the rectangular projection 22d, the concave portion 26 has one end in the width direction continuing to a projecting portion 22b on a non-joining side of the inner straight portion 22 via a rounded portion 27 having a curvature radius of R1, and the concave portion 26 has the other end in the width direction continuing to a projecting portion 21b on a non-joining side of the outer straight portion 21 via a rounded portion 28 having a curvature radius of R2. Here, the width direction of the concave portion 26 is left-right direction in a state that the supporting rib 20 is observed from a side direction as shown in FIG. 3(B).

Among rectangular projections 22c and 22d on both ends of the inner straight portion 22, the rectangular projection 22d positioned on the downstream side (lower side in FIG. 3) of the supporting rib 20 in a state that it is attached to the inner pipe 19, is longer than the rectangular projection 22c on the other side (for example longer by about twice). In the construction of this embodiment, the rectangular projection 22d is preferably longer than the rectangular projection 22c on the other side. This is because when a weight load of the inner pipe 19 is applied to a joined portion between the supporting rib 20 and the inner pipe 19 to deform the inner pipe 19, the rectangular projection 22d is deformed to follow the deformation of the inner pipe 19 having a higher rigidity, to ease stress concentration. Accordingly, it is significant that the rectangular projection 22d, that is formed to be longer than the rectangular projection 22c on the other side, is easily deformable. Further, since the inner straight portion 22 is formed to be shorter than the outer straight portion 21 on the other side, it is possible to reduce the rigidity of the inner pipe 19 side of the supporting rib 20, and accordingly, it is possible to obtain a property of following to deformation of the inner pipe 19, and to reduce a stress in a joined portion between the supporting rib 20 and the inner pipe 19.

In the connecting wall portion 23 of the supporting rib 20, the depth of the concave portion 26 is preferably within a range of at least 10% and at most 42% (a range of from 10 to 42%) based on the total length of the outer straight portion 21 (the total length of the joining face 24) in a state that the supporting rib 20 is disposed between the outer pipe 9 and the inner pipe 19 as shown in FIGS. 2 and 3, that is, in a state that the inner straight portion 22 and the outer straight portion 21 of the supporting rib 20 extend in the vertical direction. If the depth of the concave portion 26 is less than 10%, deformation of the entire supporting rib 20 becomes difficult, and the supporting rib 20 is stuck between the outer pipe 9 and the inner pipe 19, whereby the stress in the welded portion between the outer pipe 9 and the supporting rib 20 tends to be high. If the depth of the concave portion 26 exceeds 42%, the rigidity of the entire supporting rib 20 decreases to increase the stress in the supporting rib 20 itself, and the stress in the joined portion between the outer pipe 9 and the supporting rib 20 tends to be high.

Next, in the supporting rib 20 of this embodiment, significance of a structure wherein the outer straight portion 21 is longer than the inner straight portion 22 in a case of employing a thick-wall outer pipe 9 and a thin-wall inner pipe 19, will be described again. As virtual models, a supporting rib having a simple rectangular shape and a supporting rib having a trapezoidal shape whose width on the outer pipe side is different from the width on the inner pipe side, are compared. Here, the rotational displacements of the ribs supporting the inner pipe are assumed to be the same. As a result, when the supporting rib has a rectangular shape, since the rigidity of the supporting rib is the same between the inner pipe side and the outer pipe side, the amount of the rotational displacement of the supporting rib tends to be directly propagated to the outer pipe, and a large stress is applied to the welded portion of the outer straight portion. However, in the case of the supporting rib 20 of this embodiment, the inner straight portion 22 on the inner pipe side is short, the outer straight portion 21 of the outer pipe side is long, and the concave portions 26 are formed and both end portions of the outer straight portion 21 have deformable projecting shapes. In such an embodiment, the rigidity of the projecting portions 21a and 21b of the supporting rib in the outer pipe-joined portion decreases and the outer pipe-joined portion can be flexibly deformable to follow, whereby the stress applied to the joined portion between the outer straight portion 21 of the supporting rib 21 and the outer pipe 9 can be significantly reduced. Further, since the displacement difference in the left-right direction between the upper end and the lower end of the inner straight portion 22 becomes smaller as the length of the inner straight portion 22 becomes longer, it is possible to reduce the stress applied to the welded portion of the inner straight portion. Further, by increasing the lengths of the projecting portions 21a and 21b of the outer straight portion 21 on the outer pipe 9 side having a high rigidity, rotation of the outer straight portion 21 can be suppressed, and as a result, it is possible to significantly reduce the stress applied to the outer straight portion 21.

Figure 4:
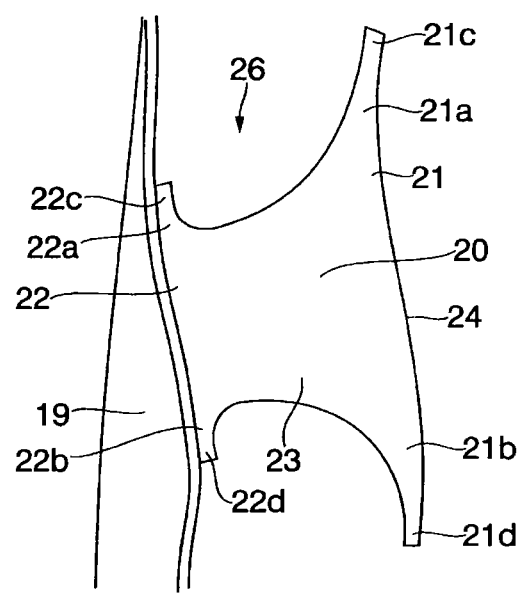
FIG. 4 is an explanation view showing an example of simulation analysis result (deformation mode) in a case where a load is applied in a state that the supporting rib shown in FIG. 3 is joined with an inner pipe and an outer pipe.

FIG. 4 is a so-called deformation mode diagram which shows in enlarged manner a deformation obtained by simulation analysis of a state wherein a load due to the weight of the inner pipe 19 is formed in a state that a supporting rib 20 having the above structure is joined between the inner pipe 19 and the outer pipe 9 as shown in FIG. 2 or FIG. 3 (b). Detail of the simulation analysis will be described later. As a result of simulation analysis in a case where the thickness of the outer pipe 9 is larger than the thickness of the inner pipe 19 and the rigidity of the outer pipe 9 is higher than the rigidity of the inner pipe 19, it is understandable that the rigidities of the projecting portions 21a and 21b and rectangular projections 21c and 21d of the supporting rib 20 in the outer pipe-joined portion decrease, and consequently, the outer pipe-joined portion can flexibly deform to follow deformation of the outer pipe 9. Further, it is understandable that since the length of the inner straight portion 22 is shorter than the length of the outer straight portion 21, the length of the joined portion with the inner pipe 19 is short. Accordingly, even if the supporting rib 20 is rotated by the weight of the inner pipe 19, the effect on the inner pipe 19 is small.

Figure 5:
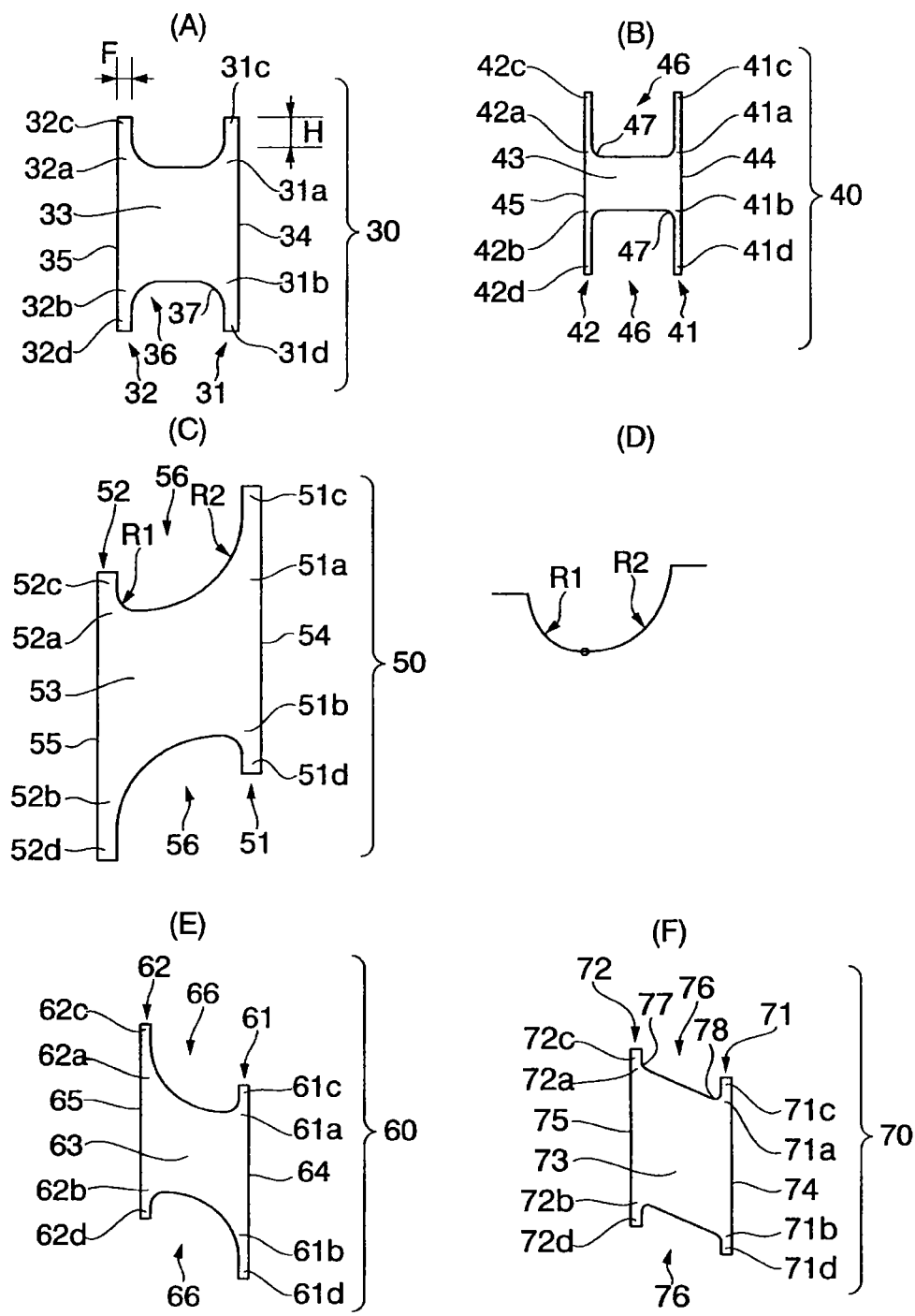

FIGS. 5(A) to 5(F) show other embodiments of the supporting rib according to the present invention, wherein FIG. 5(A) shows a supporting rib 30 of a second embodiment, FIG. 5(B) shows a supporting rib 40 of a third embodiment, FIG. 5(C) shows a supporting rib 50 of a fourth embodiment, FIG. 5(E) shows a supporting rib 60 of a fifth embodiment, and FIG. 5(F) shows a supporting rib 70 of a sixth embodiment.

The supporting rib 30 shown in FIG. 5(A) is formed into a substantially H form of point symmetry or vertical symmetry. Namely, an outer straight portion 31 joined with the outer pipe 9 and an inner straight portion 32 joined with the inner pipe 19 have the same length, and rectangular projections 31c, 31d, 32c and 32d having the same length (H) and the same width (F) are formed at leading edges of the projecting portions 31a, 31b, 32a and 32b, respectively, and between them, a connecting wall portion 33 is formed. On the outer face of the outer straight portion 31, an elongated rectangular-shaped joining face 34 for joining with the inner face of the outer pipe 9 is formed, and on the outer face of the inner straight portion 32, an elongated rectangular-shaped joining face 35 for joining with the outer face of the inner pipe 19 is formed. On both side edges of the connecting wall portion 33, respective concave portions 36 are formed, and in this embodiment, the concave portions 36 continue to both projecting portion sides via four rounded portions 37 having the same curvature radius R, and the central portion of the bottom portion in each concave portion 36 is formed into a flat shape.

By providing the supporting rib 30 having the structure shown in FIG. 5(A) so as to bridge the outer pipe 9 and the inner pipe 19 in the same manner as the supporting rib 20 of the above embodiment, it is possible to provide a conduit structure wherein no excessive stress concentration occurs in the joined portion with the inner pipe 19 and the joined portion with the outer pipe 9.

The supporting rib 40 having the structure shown in FIG. 5(B) is different from the supporting rib 30 having the structure shown in FIG. 5(A), in that it has concave portions 46 deeper than the concave portions 36, a projecting portion 41a and a rectangular projection 41c of an outer straight portion 41 longer than those of the above embodiment, a projecting portion 42a and a rectangular projection 42c of an inner straight portion 42 longer than those of the above embodiment, and a rounded portion 47 having a small curvature radius at each of portions where both side portions in the width direction of the concave portion 46 continue to the projecting portions 41a, 42a.

By providing also the supporting rib 40 having the structure shown in FIG. 5(B) so as to bridge the outer pipe 9 and the inner pipe 19 in the same manner as the supporting rib 30 of the above embodiment, it is possible to provide a conduit structure wherein no excessive stress concentration occurs in the joined portion with the inner pipe 19 and the joined portion with the outer pipe 9.

The supporting rib 50 having the structure shown in FIG. 5(C) is a structure example of point symmetry type that is the same as a supporting rib 30 having the structure shown in FIG. 5(A) except that each concave portion 36 is replaced by a concave portion 56 having a synthesized profile curve of two circles having a curvature radius R1 and a curvature radius R2, respectively, in the inner face of the concave portion shown in FIG. 5(D). The supporting rib 50 of this embodiment is the same as the above embodiment in that it has an outer straight portion 51 to be joined with the outer pipe 9, in that it has an inner straight portion 52 to be joined with the inner pipe 19, in that it has projecting portions 51a, 51b, 52a and 52b formed on both end portions of the straight portions, in that it has rectangular projections 51c, 51d, 52c and 52d formed further outside, in that it has a connecting wall portion 53 formed between them, in that it has a joining face is formed on the outer face of the outer straight portion 51, and in that it has a joining face 55 formed on the outer face of the inner straight portion 52. Since the curvature radiuses R1 and R2 of two circles constituting the inner face of the concave portion 56 are different as described above, the supporting rib 50 of this embodiment is formed so that the lengths of the projecting portions 51a and 52b are longer than the projecting portions 51b and 52a.

By also providing the supporting rib 50 having the structure shown in FIG. 5(C) so as to bridge the outer pipe 9 and the inner pipe 19 in the same manner as the supporting rib 30 of the above embodiment, it is possible to provide a conduit structure wherein no excessive stress concentration occurs in the joined portion with the inner pipe 19 and the joined portion with the outer pipe 9.

The supporting rib 60 having the structure shown in FIG. 5(E) is a structure example of point symmetry type that is the same as the supporting rib 60 having the structure shown in FIG. 5(C) except that each concave portion 56 is replaced by a concave portion 66 having a synthesized profile curve of two circles having a curvature radius R1 and a curvature radius R2, respectively, constituting the inner face of the concave portion, and having a left-right reversed shape from the concave portion 56. The supporting rib 60 of this embodiment is the same as the above embodiment in that it has an outer straight portion 61 to be joined with the outer pipe 9, in that it has an inner straight portion 62 to be joined with the inner pipe 19, in that it has projecting portions 61a, 61b, 62a and 62b formed in these both end portions, in that it has rectangular projections 61c, 61d, 62c and 62d formed on their leading edge sides, in that it has a connecting wall portion 63 formed between them, in that it has a joining face 64 formed on the outer face of the outer straight portion 61, and in that it has a joining face 64 formed on the outer face of the inner straight portion 62.

By providing also the supporting rib 60 having the shape shown in FIG. 5(E) so as to bridge the outer pipe 9 and the inner pipe 19 in the same manner as the supporting rib 50 of the above embodiment, it is possible to provide a conduit structure wherein no excessive stress concentration occurs in the joined portion with the inner pipe 19 and the joined portion with the outer pipe 9.

A supporting rib 70 having the structure shown in FIG. 5(F) is an example of point symmetry type that is the same as the supporting rib 30 having the structure shown in FIG. 5(A) except that each concave portion 36 is replaced by a rectangular-shaped concave portion 76 having an inner face constituted by planes, both end portions of the concave portion 76 in the width direction are connected to the inner straight portion 72 and the outer straight portion 71 via rounded portions 77 and 78, and the connecting wall portion 73 is formed into a slanted structure wherein the inner straight portion 72 in the inner pipe side is higher than the outer straight portion 71 on the outer pipe side. The supporting rib 70 in this embodiment is the same as the above embodiment in that it has an outer straight portion 71 to be joined with the outer pipe 9, in that it has an inner straight portion 72 to be joined with the inner pipe 19, in that it has projecting portions 71a, 71b, 72a and 72b formed in both end portions of them, in that it has rectangular projections 71c, 71d, 72c and 72d formed on their leading edge sides, in that it has a connecting wall portion 73 formed between them, in that it has a joining face 74 formed on the outer face of the outer straight portion 71, and in that it has a joining face 75 formed on the outer face of the inner straight portion 72.

By providing also the supporting rib 70 having the structure shown in FIG. 5(F) so as to bridge the outer pipe 9 and the inner pipe 19 in the same manner as the supporting rib 60 of the above embodiment, it is possible to provide a conduit structure wherein no excessive stress concentration occurs in the joined portion with the inner pipe 19 and the joined portion with the outer pipe 9.

Figure 6:
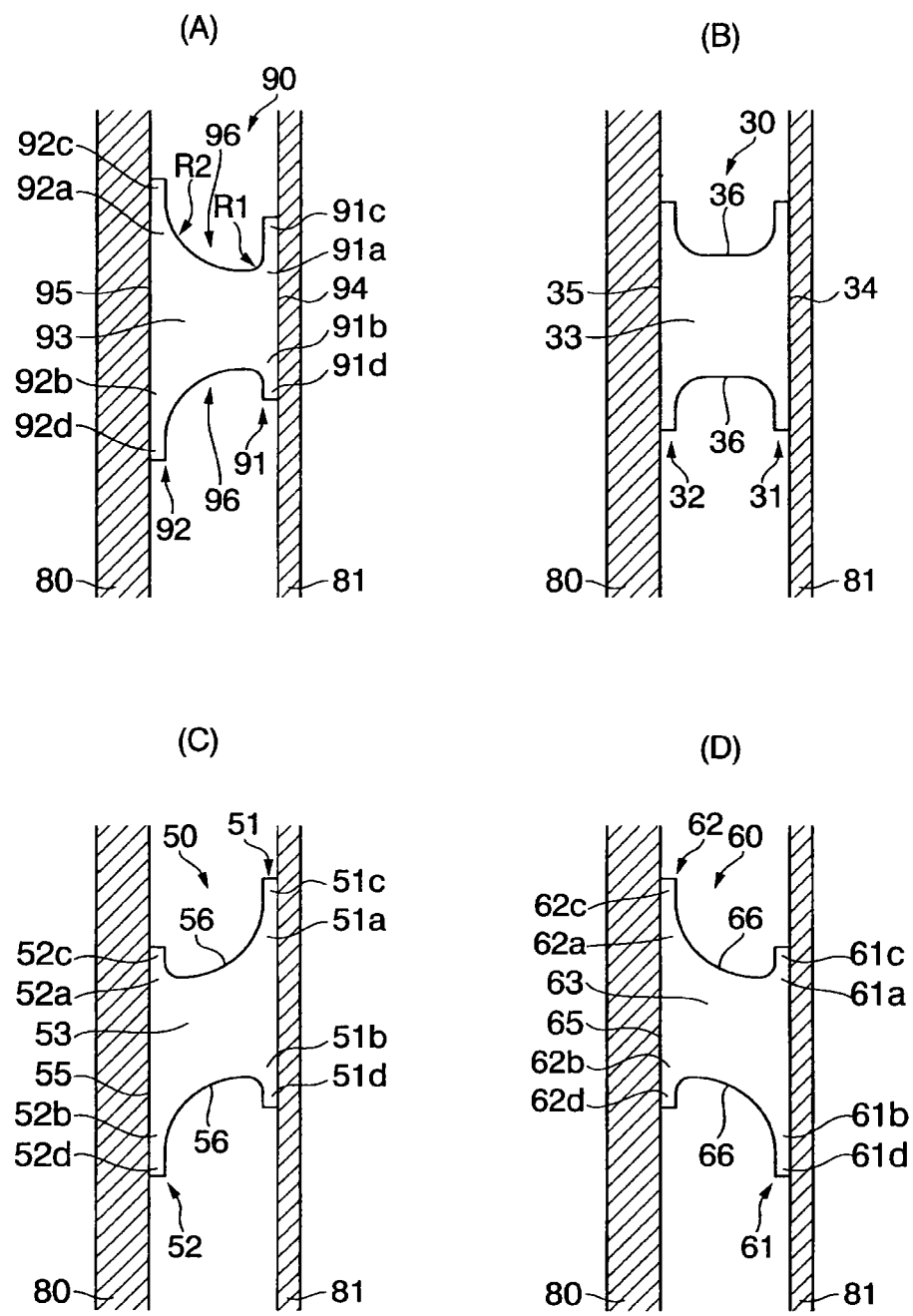

FIGS. 6(A) to 6(D) show structure examples wherein the thicknesses of the inner pipe and the outer pipe are opposite. Namely, the inner pipe 80 is formed to be thick and the outer pipe 81 is formed to be thin. When the thicknesses of the inner pipe 80 and the outer pipe 81 are opposite from the structure of the above embodiment, a supporting rib 90 having a left-right reversed shape from the supporting rib 20 of the above embodiment is applied as shown in FIG. 6(A). In the supporting rib 90 of this embodiment, the outer straight portion 91 is short and the inner straight portion 92 is long, and accordingly, the connecting wall portion 93 is formed into a reversely extending shape from the structure of FIG. 3. In a case of a supporting rib 30 shown in FIG. 6(B), since the shape is left-right symmetry, the supporting rib 30 of the above embodiment can be applied as it is. Further, also the supporting ribs 50 and 60 of the above embodiment can be applied for joining with the inner pipe 80 and the outer pipe 81 as they are. Further, it is a matter of course that each the supporting ribs 40 and 70 of the embodiments shown in FIGS. 5(B) and 5(F) can be employed for joining itself with the inner pipe 80 and the outer pipe 81.

As in the structures described above, even in a conduit structure wherein the inner pipe 80 is thick and the outer pipe 81 is thin, it is possible to apply supporting ribs of the above embodiments, and it is possible to provide a conduit structure wherein no excessive stress concentration occurs in the joined portion with the inner pipe 80 and the joined portion with the outer pipe 81.

Next, operation of a vacuum degassing apparatus 100 shown in FIG. 1 provided with any one of the above conduit structures will be described. In the vacuum degassing apparatus 100, in a state that inside of the vacuum degassing vessel 3 is maintained to be a reduced pressure state, molten glass G is supplied to the vacuum degassing vessel 3. Inside of the vacuum degassing vessel 3 is evacuated to be, for example, from 51 to 613 hPa (38 to 460 mmHg). Inside of the vacuum degassing vessel 3 is more preferably evacuated to be from 80 to 338 hPa (from 60 to 253 mmHg). Molten glass G to be vacuum-degassed by employing the vacuum degassing apparatus 100 of this embodiment is not restricted in the composition so long as it is a glass produced by a heat-melting method. Accordingly, it may be a soda lime silica glass such as soda lime glass or an alkali glass such as alkali borosilicate glass.

In a case of soda lime glass to be employed for a plate glass for architecture or for vehicles, the glass preferably has a composition of, as calculated as mass percentage based on oxides, from 65 to 75% of $SiO_2$, from 0 to 3% of $Al_2O_3$, from 5 to 15% of CaO, from 0 to 15% of MgO, from 10 to 20% of $Na_2O$, from 0 to 3% of $K_2O$, from 0 to 5% of $Li_2O$, from 0 to 3% of $Fe_2O_3$, from 0 to 5% of $TiO_2$, from 0 to 3% of $CeO_2$, from 0 to 5% of BaO, from 0 to 5% of SrO, from 0 to 5% of $B_2O_3$, from 0 to 5% of ZnO, from 0 to 5% of $ZrO_2$, from 0 to 3% of $SnO_2$, and from 0 to 0.3% of $SO_3$.

In a case of alkali-free glass employed for a liquid crystal display substrate, the glass preferably has a composition of, as calculated as mass percentage of the following oxides, from 39 to 70% of $SiO_2$, from 3 to 25% of $Al_2O_3$, from 1 to 20% of $B_2O_3$, from 0 to 10% of MgO, from 0 to 17% of CaO, from 0 to 20% of SrO and from 0 to 30% of BaO. In a case of mixed alkali glass to be employed for a substrate for a plasma display, the glass preferably has a composition of, as calculated as the following oxides, from 50 to 75% of $SiO_2$, from 0 to 15% of $Al_2O_3$, from 6 to 24% of MgO+CaO+SrO+BaO+ZnO and from 6 to 24% of $Na_2O+K_2O$.

The apparatus for producing glass products of the present invention is an apparatus having a vacuum degassing apparatus 100 described above, a melting means provided on the upstream side of the vacuum degassing apparatus 100 and for melting a glass material to produce molten glass, a forming means (forming apparatus) 200 provided on the downstream side of the vacuum degassing apparatus 100 and for forming molten glass G, and an annealing means for annealing a formed glass. Here, the melting means, the forming means and the annealing means are within the range of publicly known technique. For example, in the melting means, a glass material prepared to have a desired composition is input in a melting tank, and the glass material is heated to a predetermined temperature depending on the type of glass, for example about 1,400 to 1,600° C. in a case of soda lime glass for architecture or for vehicles, to melt the glass material to obtain a molten glass. For example, as the forming means, a forming apparatus using a float method, a fusion method or a download method, is mentioned.

Among the above, a forming apparatus employing a float bath for a float method is preferred for the reason that it can produce a large volume of high quality glass sheets having a wide range of thickness from a thin glass sheet to a thick glass sheet. Further, as the annealing means, an annealing furnace provided with a mechanism for gradually lowering the temperature of formed glass is commonly employed. The mechanism for gradually lowering the temperature employs a combustion gas or an electric heater to produce a controlled amount of heat and supplies it to required positions in the furnace to anneal a formed glass sheet. By this mechanism, it is possible to eliminate residual stress present in the formed glass sheet.

Figure 7:
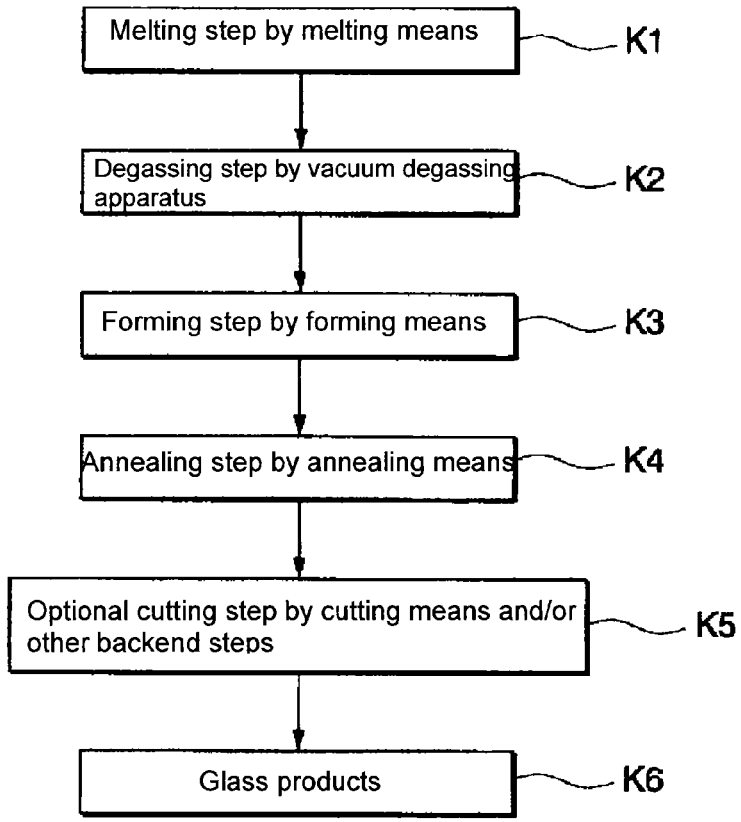
FIG. 7 is a flow chart showing an example of the process for producing glass products of the present invention.

Next, the process for producing plate glass products of the present invention will be described. FIG. 7 is a flow chart of an embodiment of the process for producing glass products of the present invention. The process for producing plate glass products of the present invention is characterized by employing the above vacuum degassing apparatus 100. The process for producing plate glass products of the present invention comprises, for example, a melting step K1 of employing a melting means as a previous stage of the vacuum degassing apparatus 100 and melting a molten glass to produce a molten glass; a degassing step K2 of employing the above vacuum degassing apparatus 100 and conducting vacuum degassing of the molten glass; a forming step K3 of forming the molten glass on the downstream side of the vacuum degassing apparatus 100; and as backend steps, an annealing step K4 of annealing the molten glass; a cutting step K5 of cutting the annealed glass; and a step K6 of obtaining glass products.

The process for producing glass products of the present invention is within the range of commonly known technique except that the above vacuum degassing apparatus 100 and the double pipe structure are employed. Further, apparatuses employed in the process for producing glass products of the present invention are as described above. FIG. 7 shows the melting step, the forming step and the annealing step, that are constituents of the process for producing glass products of the present invention, and further, the cutting step and other back-end steps that are employed as the case requires.

[Simulation of Structure of Supporting Rib]

Now, simulation analysis results of a supporting rib structure to be applied for the conduit structure according to the present invention will be described, but the present invention is not limited to the following simulation analysis results.

Here, by employing a non-linear structural analysis program MSC.MARC version 2005r3 manufactured by MSC Corporation, stress analysis simulation in a case of supporting the outer pipe and the inner pipe by supporting ribs was carried out.

In terms of detailed simulation analysis conditions, a half model was assumed, which was a half-cut shape of a conduit structure employing an outer pipe made of platinum having an outer diameter of 500 mm and a wall thickness of 2.3 mm, an inner pipe made of platinum having an outer diameter of 400 mm and a wall thickness of 1.0 mm, and ten supporting ribs (wall thickness 2.0 mm) made of platinum attached in a 50 mm gap between the outer pipe and inner pipe at intervals of 36° in the circumferential direction of the inner pipe. The outer pipe was assumed to be fixed and thereby supported by the bottom side of the vacuum degassing vessel, and a case of supporting the inner pipe by the outer pipe via the supporting ribs was simulated. The weight of the inner pipe was set to be 10 kgf, and the weight of the supporting rib was set to be 1.2 kg in the half model.

Here, in the following simulation, simulation analysis was made with respect to a conduit structure wherein ten rectangular plates made of platinum each having a height of 90 mm, width of 50 mm and a thickness of 2.0 mm were attached instead of the supporting ribs at intervals of 36° in the circumferential direction of the inner pipe under the same conditions as the above. Using twice the maximum principal stress formed in a joined portion between the rectangular plate and the outer pipe obtained in this result as a reference, the ratio of the maximum principal stress formed under each of the following conditions is shown.

Figure 8:
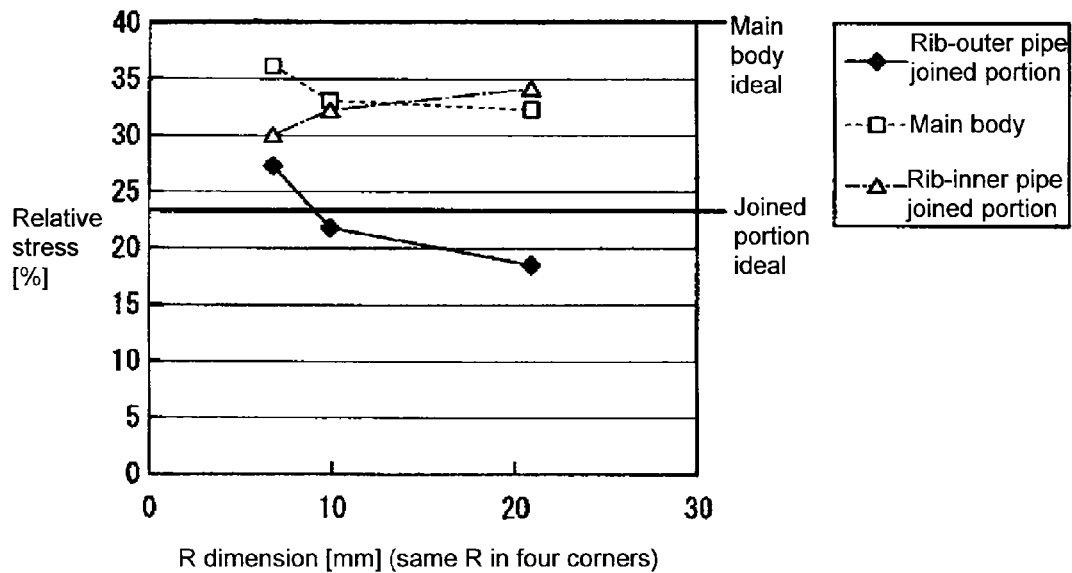
FIG. 8 is a graph showing a correlation between stress and the size of rounded portions.

In a substantially H-shaped supporting rib having four rounded portions having the same curvature radius shown in FIG. 5(A), the width F of each rectangular projection was set to be 3.75 mm, the length H of the rectangular projection was set to be 3.75 mm, the total width (length from the leading edge of one rectangular projection to the leading edge of the other rectangular projection in an outer straight portion or an inner straight portion) was set to be 90 mm, and the width (the distance from a joining face of the outer straight portion to a joining face of the inner straight portion) was set to be 50 mm. Then, with respect to each of models wherein the curvature radius R of the rounded portions was changed from 6.85 mm, 10 mm to 20.9 mm, sensitivity analysis to the curvature radius of the rounded portions of the supporting rib was carried out. FIG. 8 shows the correlation between the curvature radius (R dimension) of rounded portions and stress obtained from this simulation analysis result. With respect to the stress, a stress applied to the main body of the supporting rib (that corresponds to the main portion of the supporting rib), a stress applied to the joined portion between the supporting rib and the outer pipe, and a stress applied to the joined portion between the supporting rib and the inner pipe were separately obtained.

From the above simulation analysis results, it has become clear that stresses formed in the main body of the supporting rib and the joined portion between the supporting rib and the outer pipe decrease as the curvature radius of the R positions becomes larger. This is considered to be because stress concentration is reduced by the curvature radius of the rounded portions. It has become clear that a stress formed in the joined portion between the supporting rib and the inner pipe slightly increases as the curvature radius of the rounded portions becomes larger. This is considered to be because as the curvature radius of the rounded portions becomes larger, the rigidity of the entire supporting rib decreases and the supporting rib is more deeply rotated, whereby a force pulling the inner pipe to the outside increases.

Further, with respect to the curvature radius, within the curvature radius range of from 6.85 to 20.9 mm, the stress value was smaller than the ideal value of the main body of the supporting rib, and the stresses in the outer pipe-joined portion and inner pipe-joined portion were within a low range. Particularly, in the outer pipe-joined portion, within the range of from 10 to 20.9 mm, the stress in the joined portion is within an ideal range. Accordingly, it is understandable that it is possible to provide a conduit structure capable of securely suppressing stress concentration on the outer pipe-joined portion by selecting the curvature radius in this range.

With respect to a supporting rib of point symmetry type having the shape shown in FIG. 5(C) having rounded portions of synthesized profile of two circles having different curvature radiuses R1 and R2, the width F of rectangular projection was set to be 3.75 mm, the length of the rectangular projection was set to be 3.75 mm, and the curvature radius of rounded portions was set to be R1+R2=41.85 mm. Then, with respect to each of models having different curvature radiuses of the rounded portions, sensitivity analysis of supporting rib to curvature radiuses of the rounded portions was carried out. With respect to the conditions, assuming that the left side is the inner pipe side and the right side is the outer pipe side, R1 in the upper left and the lower right was set to be 6.85 mm and R2 in the upper right and the lower left was set to be 35 mm in one model, R1 in the upper left and the lower right was set to be 16.85 mm and R2 in upper right and the lower left was set to be 25 mm in another model, R1 in the upper left and the lower left was set to be 20.9 mm and R2 in the upper right and the lower left was set to be 20.9 mm in still another model, R1 in the upper left and the lower left was set to be 25 mm and R2 in the upper right and the lower left was set to be 16.85 mm in still another model, and R1 in the upper left and the lower left was set to be 35 mm and R2 in the upper right and the lower left was set to be 6.85 mm in still another model.

Figure 9:
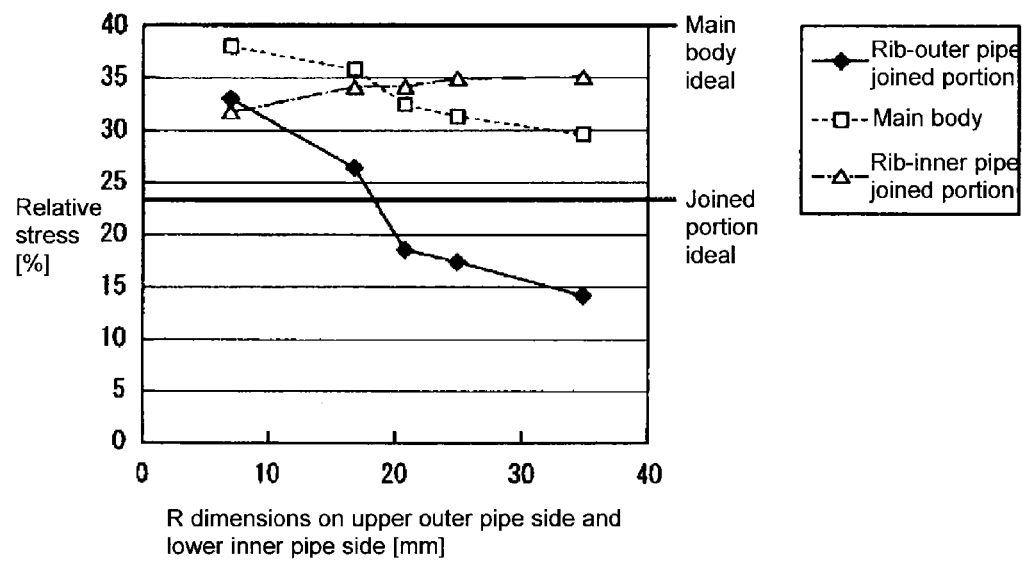
FIG. 9 is a graph showing a correlation between stress and dimensions of rounded portions on the upper outer pipe side and lower inner pipe side.

FIG. 9 shows the correlation between the curvature radius (R dimension) of the rounded portions and stress obtained by the above simulation analysis results. With respect to the stress, a stress applied to the main body of the supporting rib, a stress applied to the joined portion between the supporting rib and the outer pipe, and a stress applied to the joined portion between the supporting rib and the inner pipe were separately obtained.

It has been understood that the result shown in FIG. 9 has the same tendency as the result shown in FIG. 8. Namely, it has become clear that a stresses formed in the main body of the supporting rib and the joined portion between the supporting rib and the outer pipe become smaller as the curvature radius of the rounded portions becomes larger (within a range of from 6.85 to 35 mm). Further, it has become clear that a stress formed in the joined portion between the supporting rib and the inner pipe slightly increases as the curvature radius of the rounded portion becomes larger. Here, as shown in FIG. 9, it has become clear that a stress formed in the joined portion between the supporting rib and the outer pipe significantly decreases as the curvature radius of the rounded portion becomes larger.

Next, in a model of supporting rib wherein the length of the inner straight portion to be joined with the inner pipe is different from the length of the outer straight portion to be joined with the outer pipe, simulation analysis of stress load state under a condition of inner pipe load was carried out.

In this simulation analysis, comparison was made between a supporting rib of rectangular shape and a supporting rib of the present invention, to obtain stress values. As the shape of the rib according to the present invention, a supporting rib (2 mm thick) was assumed, wherein the length of the outer straight portion to be joined with the outer pipe was 90.0 mm, the length of the inner straight portion to be joined with the inner pipe was 42.5 mm, the distance between the outer pipe and the inner pipe was 50.0 mm, R of rounded portions in the upper and lower positions on the outer pipe side and inner pipe side were all 5 mm, and the width of each projecting portion continuing to each of inner and outer straight portions was 10.0 mm, which was an original shape whose bottom side, that is the outer straight portion, was assumed to be joined with the outer pipe and whose top side, that is the inner straight portion, was assumed to be joined with the inner pipe. Other simulation analysis conditions were the same as those of the above example.

Further, an analysis model in a case where the above supporting rib of the present invention is joined in the reverse direction between the inner pipe and the outer pipe, was produced and analyzed. Further, the above simulation analysis was a simulation analysis assuming that the thickness of the outer pipe was larger than the thickness of the inner pipe (outer pipe 2.3 mm, inner pipe 1 mm). In addition, as a reversed simulation analysis model, a simulation analysis in a case where the thickness of the inner pipe was larger than the thickness of the outer pipe (inner pipe 2.3 mm, outer pipe 1 mm) was also carried out.

Table 1 below describes all maximum principal stress values obtained from the simulation analysis results (ratios based on twice the maximum principal stress formed in a joined portion between a rectangular plate and the outer pipe in a case where the above rib is rectangular in this simulation).

TABLE 1

| | | Relative stress (%) in rib-outer pipe joined portion | Relative stress (%) in rib-inner pipe joined portion |
|---|---|---|---|
| Outer pipe is thick (outer pipe: 2.3 mm, Inner pipe: 1 mm) | Rectangular supporting rib | 51 | 28 |
| | Outer pipe side is long | 45 | 29 |
| | Inner pipe side is long | 77 | 64 |
| Inner pipe is thick (outer pipe: 1 mm, Inner pipe: 2.3 mm) | Rectangular supporting rib | 238 | 79 |
| | Outer pipe side is long | 194 | 107 |
| | Inner pipe side is long | 86 | 89 |

From the results shown in Table 1, it has become clear that in a case where the outer pipe is thick, it is possible to significantly reduce the stress value by making the outer straight portion on the outer pipe side longer than the inner straight portion, and in a case where the inner pipe is thick, it is possible to significantly reduce the stress value by making the inner straight portion on the inner pipe side longer than the outer straight portion.

Namely, it has become clear that in both of a case where the outer pipe is thick and a case where the inner pipe is thick, it is possible to significantly reduce the stress value by making the length of the outer straight portion to be joined with an outer pipe having large thickness or the length of an inner straight portion to be joined with an inner pipe having a larger thickness longer than the other straight portion.

Here, from the simulation analysis results shown in Table 1, it has become clear that by making the length of the outer straight portion to be joined with the thick outer pipe larger than the length of the inner straight portion to be joined with a thin inner pipe, it is possible to significantly reduce the stress value in a joined portion between the supporting rib and the outer pipe to be a half while suppressing increase of the stress value in a joined portion between the supporting rib and the inner pipe. This is because in a structure of suspending an inner pipe by an outer pipe via supporting ribs, the rotational displacement of each supporting rib caused by a force applied to the supporting rib by weight of the inner pipe, is generally dominated by a pipe having a high rigidity. Accordingly, when the straight portions of the rib is reversely joined and the inner pipe is made thick, the thick inner pipe has a large weight, and a short outer straight portion is joined with a thin outer pipe. Consequently, the supporting rib makes a large rotational displacement, and it is assumed that a high stress was formed in each of the outer pipe-joined portion and the inner pipe-joined portion.

Figure 10:
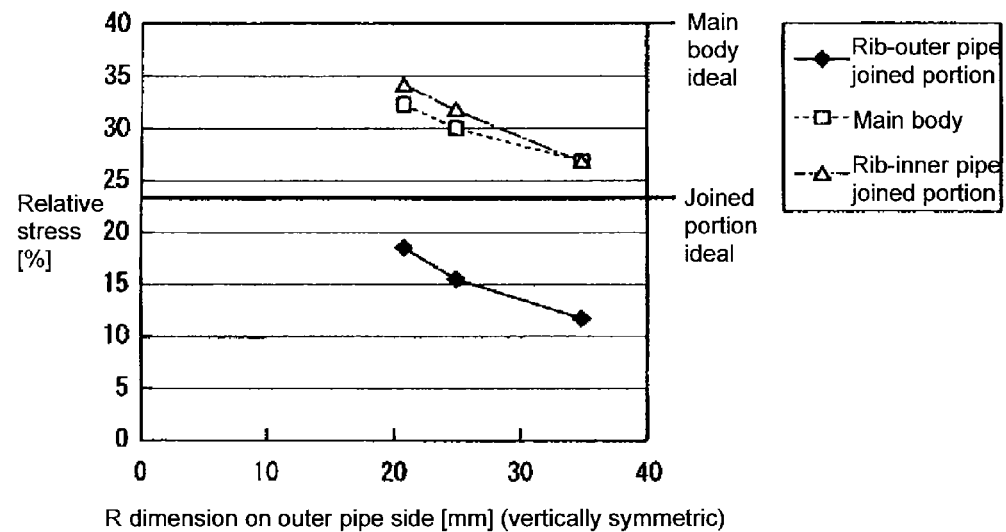
FIG. 10 is a graph showing a correlation between stress and dimensions of rounded portions of outer pipe side.

Next, with respect to a vertically symmetric supporting rib (a supporting rib model of FIG. 5(A)), the width F of each rectangular projection was set to be 3.75 mm, the length H of the rectangular projection was set to be 3.75 mm, and the curvature radius R of rounded portions was set to be 41.85 mm in terms of the sum total of R1 and R2. With respect to each of models having different curvature radiuses of rounded portions, sensitivity analysis of the supporting rib to curvature radius of rounded portions was carried out. The conditions were set so that R on the outer pipe side was set to be 20.9 mm and R on the inner pipe side was set to be 20.9 mm in one model, R on the outer pipe side was set to be 25 mm and R on the inner pipe side was set to be 16.85 mm in another model, and R on the outer pipe side was set to be 35 mm and R on the inner pipe side was set to be 6.85 mm in still another model. FIG. 10 shows the correlation between the curvature radius of the rounded portion on the outer pipe side and the stress obtained from the above simulation analysis result. With respect to the stress, a stress applied to the main body of the supporting rib, a stress applied to the joined portion between the supporting rib and the outer pipe, and a stress applied to the joined portion between the supporting rib and the inner pipe, were separately obtained.

From the results shown in FIG. 10, it has become clear that by increasing the curvature radius of the rounded portion on the outer pipe side, each of a stress in the joined portion between the supporting rib and the outer pipe, a stress in the main body of the supporting rib and a stress in the joined portion between the supporting rib and the inner pipe can be reduced. This is presumed to be an integrated effect of such features that the inner straight portion of the supporting rib is shorter than the outer straight portion, the connecting wall portion becomes gradually wider from the inner straight portion side toward the outer straight portion side, rectangular projections are present on both end portions of each straight portion, both end portions of the outer straight portion are particularly thin and continue to respective rectangular projections, and consequently, these portions can flexibly deform to follow deformation of the outer pipe.

When the foregoing simulation analysis results shown in FIG. 10 are pieced together, a condition that R on the outer pipe side is 35 mm and R on the inner pipe side is 6.85 mm is considered to be the most preferable shape since the supporting rib can most efficiently reduce stresses formed on various portions under such a condition. This condition corresponds to a shape close to the supporting rib 20 of the first embodiment explained with reference to FIG. 3 above. The difference between the supporting rib having the shape of this condition and the supporting rib 20 shown in FIG. 3, is only the length of a rectangular projection 22b formed on the lower end side of the inner straight portion 22.

Next, with respect to a supporting rib model having a substantially H shape, that had a supporting rib shape wherein the joining lengths with the inner pipe and the outer pipe were each 90 mm, the distance between the outer pipe and the inner pipe was 50 mm, the width of the rectangular projection was 5 mm, the length B of the rectangular projection was 10 mm and the concave portion was a rectangular shape having a depth of 10 mm, a sensitivity analysis to the length of the rectangular projection was carried out. Here, as described above, in order to simplify calculation model, rounded portions on both sides in the width direction of each concave portion were omitted to form a model. Accordingly, there is no length of projecting portions, and the length B of the rectangular projection is equal to the depth of the concave portion.

Figure 11:
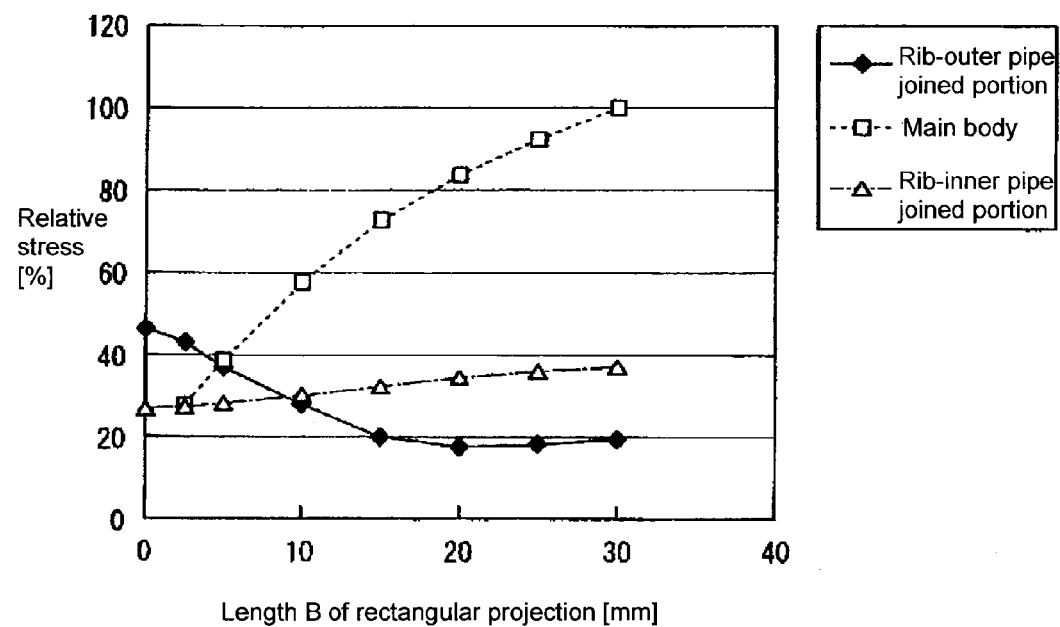
FIG. 11 is a graph showing a correlation between stress and the length of rectangular projection.

The analysis was carried out in cases of supporting ribs wherein the length of the rectangular projection was changed from 0 to 30 mm. FIG. 11 shows the correlation between the length of rectangular projection and stress obtained from the simulation analysis result. With respect to the stress, a stress applied to the main body of the supporting rib, a stress applied to the joined portion between the supporting rib and the outer pipe, and a stress applied to the joined portion between the supporting rib and the inner pipe, were separately obtained.

The results shown in FIG. 11 shows that when the length B of the rectangular projection is between 0 to 15 mm, as the length B of the rectangular projection becomes large, the stress in the joined portion between the supporting rib and the outer pipe becomes small. This is considered to be because when the length B of the rectangular projection is large, the rigidity of the rectangular projection on each of four corners of the supporting rib becomes low, whereby a force of pulling the outer pipe becomes small. As the length B of the rectangular projection increases, the stress in the joined portion between the supporting rib and the inner pipe slightly increases. This is because when the length B of the rectangular projection is large, the rigidity of the entire supporting rib becomes low, whereby the supporting rib is deeply rotated and strongly pulls the lower end of the inner pipe outwardly.

Here, as the length B of a rectangular projection becomes large, a stress formed in the main body of the supporting rib becomes large. However, when ten supporting ribs are joined between the inner pipe and the outer pipe, it is considered to be advantageous to reduce stresses formed in the joined portion with the inner pipe and the joined portion with the outer pipe even if a certain high stresses is formed in the supporting ribs, and the above structure is advantageous in this respect.

Further, in the simulation analysis, rounded portions on both sides in the width direction of the concave portion were omitted, and the simulation analysis was focused on only sensitivity analysis of rectangular projections. However, in a supporting rib actually employed, it is preferred to provide rounded portions to avoid excessive concentration of stress on a substrate-end side of the rectangular projection and consequent shearing of the rectangular projection.

Particularly, when lowering of a stress formed in the joined portion between the supporting rib and the outer pipe is considered to be the most important, the length of each rectangular projection is preferably within a range of from 10 to 30 mm, preferably within a range of from 15 to 30 mm.

Next, with respect to a case where the height of the inner end and the height of the outer end of a supporting rib is different in the shape of the supporting rib, that is, with respect to a case where the supporting rib has a slanted structure, structural analysis was conducted by simulation.

Using as a basic structure a supporting rib model of substantially H shape having no slanted structure, wherein the joining length between the outer pipe and the inner pipe was 90 mm, the distance between the outer pipe and the inner pipe was 50 mm, the width of each rectangular projection was 5 mm, the length of each rectangular projection was 10 nm, and each concave portion was a rectangular shape having a depth of 10 mm, structural analysis by simulation was carried out with respect to a case where such a basic structure is changed to be a slanted structure.

Figure 12:
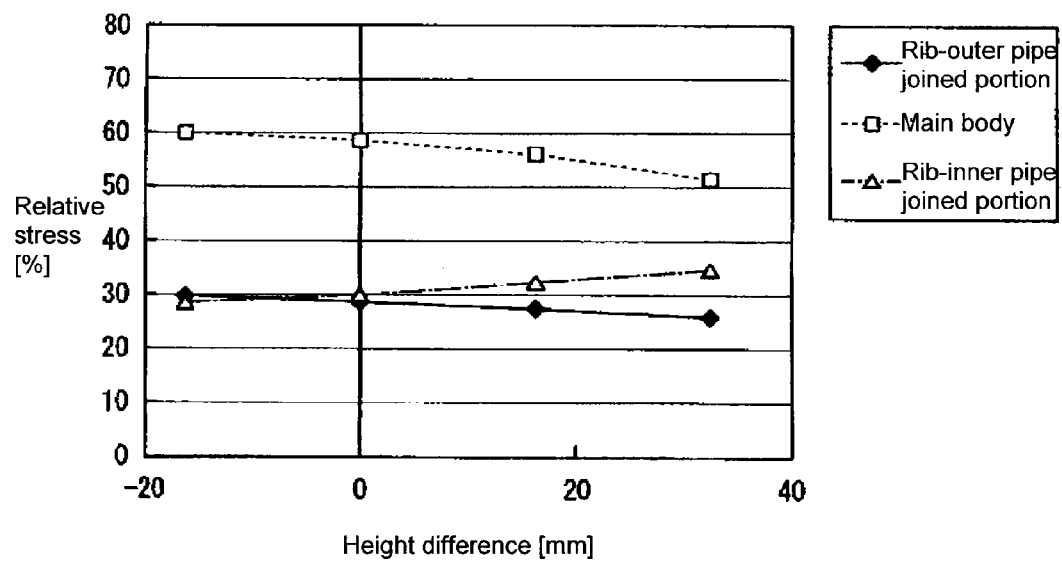
FIG. 12 is a view showing a correlation between stress and the height difference.

With respect to the analysis conditions, a supporting rib wherein the height of a rectangular projection of outer pipe side was 16.25 mm lower than the height of a rectangular projection on the inner pipe side, a supporting rib wherein the difference between the height of a rectangular projection on the inner pipe side and the height of a rectangular projection on the outer pipe side was 0 mm, a supporting rib wherein the height of a rectangular projection on the inner pipe side was 16.25 mm lower than the height of a rectangular projection on the outer pipe side, and a supporting rib wherein the height of a rectangular projection on the inner pipe side was 32.5 mm lower than the height of a rectangular projection on the outer pipe side, were assumed. FIG. 12 shows the correlation between the height difference of rectangular projections and the stress obtained from the above simulation analysis results. With respect to the stress, a stress applied to the main body of the supporting rib, a stress applied to the joined portion between the supporting rib and the outer pipe, and a stress applied to the joined portion between the supporting rib and the inner pipe, were separately obtained.

From the results shown in FIG. 12, it has understood that by forming a supporting rib into a slanted structure, stresses in the main body of the supporting rib and the joined portion with the outer pipe become slightly smaller as the height of the inner pipe side of the supporting rib becomes lower. This is considered to be because as the angle of the joined portion increases from 90°, concentration of stress becomes low. Further, a stress in the joined portion with the inner pipe slightly increases as the inner pipe side of the supporting rib becomes lower. This is considered to be because although the rotation angle of the supporting ribs does not substantially change, the displacement amount on the lower left side of the supporting rib increases as the inner pipe side becomes lower. Accordingly, a knowledge that although the slanted structure of the supporting rib is not very effective to significantly lower the stress value, it can change the tendency of stress value. Accordingly, since it is possible to achieve the object of the present invention also when the supporting rib has a slanted structure, a slanted structure may be employed for the shape of the supporting rib. From this viewpoint, the supporting ribs 50, 60 and 70 having the structures shown in FIGS. 5(C), 5(E) and 5(F), respectively, also can be employed as embodiments of the present invention.

Next, with respect to substantially H-shaped supporting rib models wherein the depth of the concave portion was changed, structural analysis by simulation was carried out.

Specifically, a substantially H-shaped supporting rib wherein the total length of the inner straight portion and the total length of the outer straight portion were each 90 mm and the width was 50 mm, was assumed as a model, and simulation analysis of stress load state was carried out with respect to a supporting rib wherein the depth of the concave portion was 8.5 mm, a supporting rib wherein the depth of the concave portion was 10.6 mm, a supporting rib wherein the depth of the concave portion was 15.6 mm, a supporting rib wherein the depth of the concave portion was 20.6 mm, a supporting rib wherein the depth of the concave portion was 30.6 mm, and a supporting rib wherein the depth of the concave portion was 38.1 mm. Here, differently from the model of FIG. 11, modeling was made without omitting rounded portions on both sides in the width direction of the concave portion. Accordingly, the depth of the concave portion is defined as a sum total of the length of the rectangular projection and the length of the rectangular projection. In this model, R of all rounded portions was set to be 6.85 mm.

Figure 13:
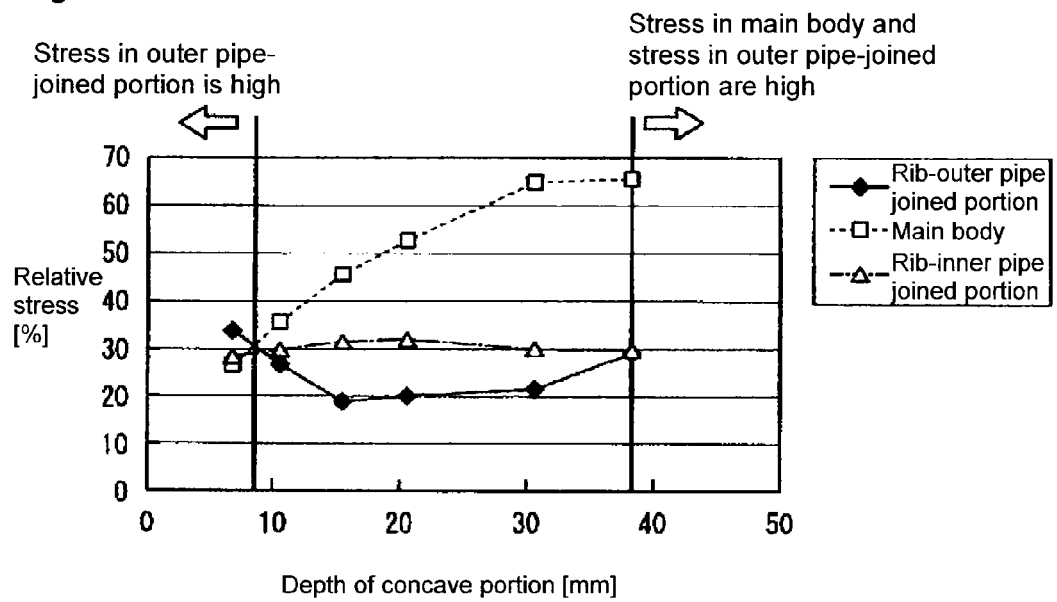
FIG. 13 is a graph showing a correlation between stress and the depth of concave portion.

FIG. 13 shows the correlation between the depth of the concave portion and the stress obtained from the above simulation analysis results. Here, this figure also shows a ratio based on twice the maximum principal stress formed on a joined portion between a rectangular plate and the outer pipe when the rib is a rectangular shape, that is the relative stress.

With respect to the stress, a stress applied to the main body of the supporting rib, a stress applied to the joined portion between the supporting rib and the outer pipe, and a stress applied to the joined portion between the supporting rib and the inner pipe, were separately obtained. Here, all of the stress values shown in FIG. 3 are described in Table 2 below.

TABLE 2

| Depth of concave portion [mm] | Relative stress in simulation analysis [%] | | |
|---|---|---|---|
| | Outer pipe-joined portion | Main body | Inner pipe-joined portion |
| 6.85 | 34 | 26 | 29 |
| 10.6 | 27 | 36 | 30 |
| 15.6 | 19 | 46 | 32 |
| 20.6 | 20 | 53 | 32 |
| 30.6 | 22 | 65 | 31 |
| 38.1 | 29 | 66 | 30 |

According to the results shown in FIG. 13 and Table 2, as the depth of the concave portion becomes large, stress in the main body of the supporting rib increases, but a stress applied to the joined portion between the supporting rib and the inner pipe hardly changes and constant, and a stress applied to the joined portion between the supporting rib and the outer pipe was equivalent or lower than the stress in the inner pipe-joined portion when the concave portion depth was within a range of from 9 mm (10% of total length) to 38.1 mm (42% of total length). However, in terms of the stress in the joined portion between the supporting rib and the outer pipe, according to the simulation analysis result with respect to the concave portion depth 10.6 mm (11% of total length) and 6.85 mm (8% of total length), the stress value tends to significantly increase as the concave portion depth becomes smaller, and accordingly, the lower limit of the concave portion depth is preferably 9 mm (9% of total length). Further, in terms of the upper limit of the concave portion depth, increasing tendency of stress value was observed from the simulation analysis results of 30.6 mm (34% of total length) and 38.1 mm (42% of total length), and the same stress value as that of the inner pipe-joined portion was shown in the case of 38.1 mm (42% of total length). Accordingly, 38.1% (42% of total length) seems to be the upper limit.

The above simulation analysis was made with respect to a case where the outer pipe was 2.3 mm, the inner pipe was 1.0 mm and the supporting rib thickness was 2.0 mm, and accordingly, a relation that inner pipe thickness (1 mm)<supporting rib thickness (2 mm)<outer pipe thickness (2.3 mm) was satisfied. Further, a simulation analysis was carried out also with respect to a case where a relation that inner pipe thickness<supporting rib thickness<outer pipe thickness was satisfied.

Specifically, the simulation analysis was carried out under the same conditions as those of FIG. 13 except that the supporting rib thickness was 1.2 mm instead of the supporting rib thickness 2 mm of FIG. 13 and Table 2. Table 3 shows the correlation between the concave portion thickness and the stress. With respect to the stress, a stress formed in the main body of the supporting rib, a stress formed in the joined portion between the supporting rib and the outer pipe, and a stress formed in the joined portion between the supporting rib and the inner pipe, were separately obtained. Here, Table 3 shows a ratio based on twice the maximum principal stress formed in a joined portion between a rectangular plate and the out pipe when the rib is rectangular, that is a relative stress.

From the results shown in Table 3, also in a case where the thickness of the supporting rib was 1.2 mm, the same tendency as that of Table 2 was observed.

TABLE 3

| Depth of concave portion [mm] | Relative stress in simulation analysis [%] | | |
|---|---|---|---|
| | Outer pipe-joined portion | Main body | Inner pipe-joined portion |
| 6.85 | 38 | 30 | 23 |
| 10.6 | 25 | 40 | 23 |
| 15.6 | 17 | 49 | 23 |
| 20.6 | 19 | 57 | 23 |
| 30.6 | 23 | 68 | 19 |
| 38.1 | 23 | 68 | 23 |

INDUSTRIAL APPLICABILITY

According to the present invention, in a conduit structure for molten glass employing a double pipe structure having an inner pipe and an outer pipe in a flow path of molten glass in glass-producing equipment, which can thereby separate with good efficiency only a boundary laminar flow of molten glass containing bubbles and foreign objects, a supporting rib having a specific structure for connecting the inner pipe and the outer pipe is provided. Consequently, it is possible to avoid deformation, fracture or damage due to excessive concentration of stress in a joined portion between the supporting rib and the inner pipe or the outer pipe, and to operate such glass-producing equipment for a long time. The conduit structure for molten glass of the present invention can be widely applicable to a flow path of molten glass in various types of glass-producing equipment, and is useful. Further, when the conduit structure for molten glass of the present invention is applied to a flow path of a vacuum degassing apparatus for molten glass, it is possible to operate the vacuum degassing apparatus for a long time, and is useful.

The vacuum degassing apparatus, the apparatus for producing glass products, and the process for producing glass products of the present invention are applicable to production of glass products for architecture, for vehicles, for flat panel displays, for optical use, for medical use and other wide range of glass products.

This application is a continuation of PCT Application No. PCT/JP2011/067518, filed on Jul. 29, 2011, which is based upon and claims the benefit of priority from Japanese Patent Application No. 2010-175504 filed on Aug. 4, 2010. The contents of those applications are incorporated herein by reference in its entirety.

REFERENCE SYMBOLS

100 . . . Vacuum degassing apparatus, G . . . molten glass, 200 . . . forming apparatus, 1 . . . melting tank, 2 . . . housing, 3 . . . vacuum degassing vessel, 5 . . . uprising pipe, 6 . . . downfalling pipe, 8, 9 . . . outer pipe (extension pipe), 12 . . . upstream pit, 15 . . . downstream pit, 16 . . . drain out, 19 . . . inner pipe, 20 . . . supporting rib, 21 . . . outer straight portion, 21$a$, 21$b$ . . . projecting portion, 21$c$, 2$d$ . . . rectangular projection, 22 . . . inner straight portion, 21$a$, 22$b$ . . . projecting portion, 22$c$, 22$g$ . . . rectangular projection, 23 . . . connecting wall portion, 24, 25 . . . joining face, 26 . . . concave portion, 27, 28 . . . rounded portion, 30, 40, 50, 60, 70 . . . supporting rib, 31, 41, 51, 61, 71, 91 . . . outer straight portion, 32, 42, 52, 62, 72, 92 . . . inner straight portion, 31$a$, 31$b$, 32$a$, 32$b$ . . . projecting portion, 31$c$, 31$d$, 32$c$, 32$d$ . . . rectangular projection, 41$a$, 41$b$, 42$a$, 42$b$ . . . projecting portion, 41$c$, 41$d$, 42$c$, 42$d$ . . . rectangular projection, 51$a$, 51$b$, 52$a$, 52$b$ . . . projecting portion, 51$c$, 51$d$, 52$c$, 42$d$ . . . rectangular projection, 61$a$, 61$b$, 62$a$, 62$b$ . . . projecting portion, 61$c$, 61$d$, 62$c$, 52$d$ . . . rectangular projection, 71$a$, 71$b$, 72$a$, 72$b$ . . . projecting portion, 71$c$, 71$d$, 72$c$, 72$d$ . . . rectangular projection, 91$a$, 91$b$, 92$a$, 92$b$ . . . projecting portion, 91$c$, 91$d$, 92$c$, 92$d$ . . . rectangular projection, 80 . . . inner pipe, 81 . . . outer pipe.

What is claimed is:

1. A conduit structure for molten glass comprising a hollow tube made of a metal, the conduit structure having at least a downstream end having a double pipe structure comprising an inner pipe and an outer pipe, wherein a supporting rib is provided between the inner pipe and the outer pipe to bridge the inner pipe and the outer pipe;

wherein the supporting rib has an inner straight portion joined with the outer face of the inner pipe so as to extend along the longitudinal direction of the inner pipe and having a width substantially in a normal direction to the joined face, an outer straight portion joined with the inner face of the outer pipe so as to extend along the longitudinal direction of the outer pipe and having a width substantially in the normal direction to the joined face, and a connecting wall portion extending from the inner straight portion to the outer straight portion to integrate them; and the supporting rib has a concave portion formed along one side edge of the connecting wall portion present between one side end portion of the inner straight portion and one side end portion of the outer straight portion, so that respective ends of said one side edge reach said one side end portions of the respective straight portions via rounded portions, and a concave portion formed along the other side edge of the connecting wall portion present between the other side end portion of the inner straight portion and the other side end portion of the outer straight portion, so that respective ends of said other side edge reach said other side end portions of the respective straight portions via rounded portions, and the supporting rib has projecting portions formed on respective ends of the inner straight portion and respective ends of the outer straight portion and continuing to the respective rounded portions.

2. The conduit structure for molten glass according to claim 1, wherein the depth of the concave portion is within a range of at least 10% and at most 42% based on the total length of the inner straight portion or the length of the outer straight portion of the supporting rib, whichever longer.

3. The conduit structure for molten glass according to claim 1, wherein the projecting portion has a rectangular projection forming the leading edge side of the projecting portion and having a uniform width in substantially the normal direction to the joined face.

4. The conduit structure for molten glass according to claim 3, wherein the leading edge shape of the rectangular projection is a shape which forms a step portion on the outer face of the inner pipe or the inner face of the outer pipe when the rectangular protrusion is joined with the outer face or the inner face.

5. The conduit structure for molten glass according to claim 1, wherein a region between the outer pipe and the inner pipe is a region which gives passage for mainly a boundary laminar flow, that probably contains foreign objects or bubbles, in a molten glass flowing inside the outer pipe, and a means for separating the boundary laminar flow from a main flow, that is the central portion of the molten glass flow, is provided on the terminal side of the region between the outer pipe and the inner pipe.

6. The conduit structure for molten glass according to claim 1, wherein the wall thickness of the outer pipe is different from the wall thickness of the inner pipe, and the outer pipe or the inner pipe, whichever has a larger wall thickness, supports the other pipe via the supporting rib.

7. The conduit structure for molten glass according to claim 1, wherein the wall thickness of the outer pipe is different from the wall thickness of the inner pipe, and the outer straight portion or the inner straight portion, whichever is connected to a pipe having a larger wall thickness, is longer than the other straight portion.

8. The conduit structure for molten glass according to claim 7, wherein the wall thickness of the outer pipe is larger than the wall thickness of the inner pipe.

9. The conduit structure for molten glass according to claim 1, wherein a plurality of the supporting ribs are provided at predetermined intervals in the circumferential direction of the inner pipe.

10. The conduit structure for molten glass according to claim 1, wherein the extension direction of a connecting wall portion integrating the inner straight portion and the outer straight portion is slanted toward the upstream side or the downstream side of the flow direction of molten glass from the inner pipe side to the outer pipe side, and the center position of the joined portion between the inner straight portion and the inner pipe in the longitudinal direction is different from the center position of the joined portion between the outer straight portion and the outer pipe in the longitudinal direction, along the flow direction of molten glass.

11. The conduit structure for molten glass according to claim 3, wherein among rectangular projections formed on both ends of the inner straight portion, the length of a rectangular projection on the upstream side of the inner pipe is longer than the length of the rectangular projection on the downstream side of the inner pipe.

12. A vacuum degassing apparatus comprising a vacuum degassing vessel, an uprising pipe for supplying molten glass to the vacuum degassing vessel, and a downfalling pipe for discharging vacuum-degassed molten glass from the vacuum degassing vessel, wherein a terminal side portion of the downfalling pipe or an extension pipe continuing from the downfalling pipe has the conduit structure for molten glass as defined in claim 1.

13. A vacuum degassing method for molten glass, which employs a vacuum degassing apparatus having a vacuum degassing vessel, an uprising pipe for supplying molten glass to the vacuum degassing vessel, and a downfalling pipe for discharging vacuum-degassed molten glass from the vacuum degassing vessel, the method comprising separating a part of the molten glass by employing the conduit structure as defined in claim 1 on the terminal side of the downfalling pipe or in an extension pipe continuing from the downfalling pipe.

14. An apparatus for producing glass products, which comprises the vacuum degassing apparatus as defined in claim 12, a melting means provided on the upstream side of the vacuum degassing apparatus and for melting a glass material to produce molten glass, a forming means provided on the downstream side of the vacuum degassing apparatus and for forming the molten glass, and an annealing means for annealing the formed glass.

15. A process for producing glass products, which comprises a step of vacuum-degassing molten glass by the vacuum degassing method for molten glass as defined in claim 13, a melting step of melting a glass material on the upstream side of the vacuum degassing apparatus to produce molten glass, a forming step of forming the molten glass on the downstream side of the vacuum degassing apparatus, and an annealing step of annealing the formed glass.

* * * * *